United States Patent
Yamamoto et al.

(10) Patent No.: US 6,658,017 B2
(45) Date of Patent: *Dec. 2, 2003

(54) COMMUNICATION NETWORK, AND NODE DEVICE USED THEREIN AND CONTROL METHOD THEREFOR

(75) Inventors: Takahisa Yamamoto, Kawasaki (JP); Toru Nakata, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 20 days.

(21) Appl. No.: 09/188,108

(22) Filed: Nov. 9, 1998

(65) Prior Publication Data

US 2003/0043855 A1 Mar. 6, 2003

(30) Foreign Application Priority Data

Nov. 12, 1997 (JP) .............................................. 9-310472

(51) Int. Cl.[7] ................................................. H04J 3/16
(52) U.S. Cl. ........................ 370/437; 370/412; 370/422; 370/428; 370/463
(58) Field of Search .................................. 370/217, 221, 370/225, 432, 436, 437, 442, 487, 463, 422, 423, 428, 429, 412, 413, 415, 417

(56) References Cited

U.S. PATENT DOCUMENTS

| | | | |
|---|---|---|---|
| 5,223,972 A | 6/1993 | Nishimura et al. | 359/337 |
| 5,414,414 A * | 5/1995 | Suzuki | 340/825.01 |
| 5,790,523 A * | 8/1998 | Ritchie, Jr. et al. | 370/487 |
| 5,801,859 A | 9/1998 | Yamamoto | 359/119 |
| 5,859,718 A * | 1/1999 | Yamamoto et al. | 370/436 |
| 6,160,813 A | 12/2000 | Banks et al. | 370/422 |

FOREIGN PATENT DOCUMENTS

| | | | |
|---|---|---|---|
| JP | 8-237306 | 9/1996 | H04L/12/56 |

* cited by examiner

Primary Examiner—Dang Ton
Assistant Examiner—Shick Hom
(74) Attorney, Agent, or Firm—Fitzpatrick, Cella, Harper & Scinto

(57) ABSTRACT

It is intended to retard transmission delay in a communication network. Thus, in a network system adapted so that communication channels for transmitting data inputted to a node device are selected in predetermined order, the timing of changing the communication channel is controlled among a plurality of node devices.

10 Claims, 32 Drawing Sheets

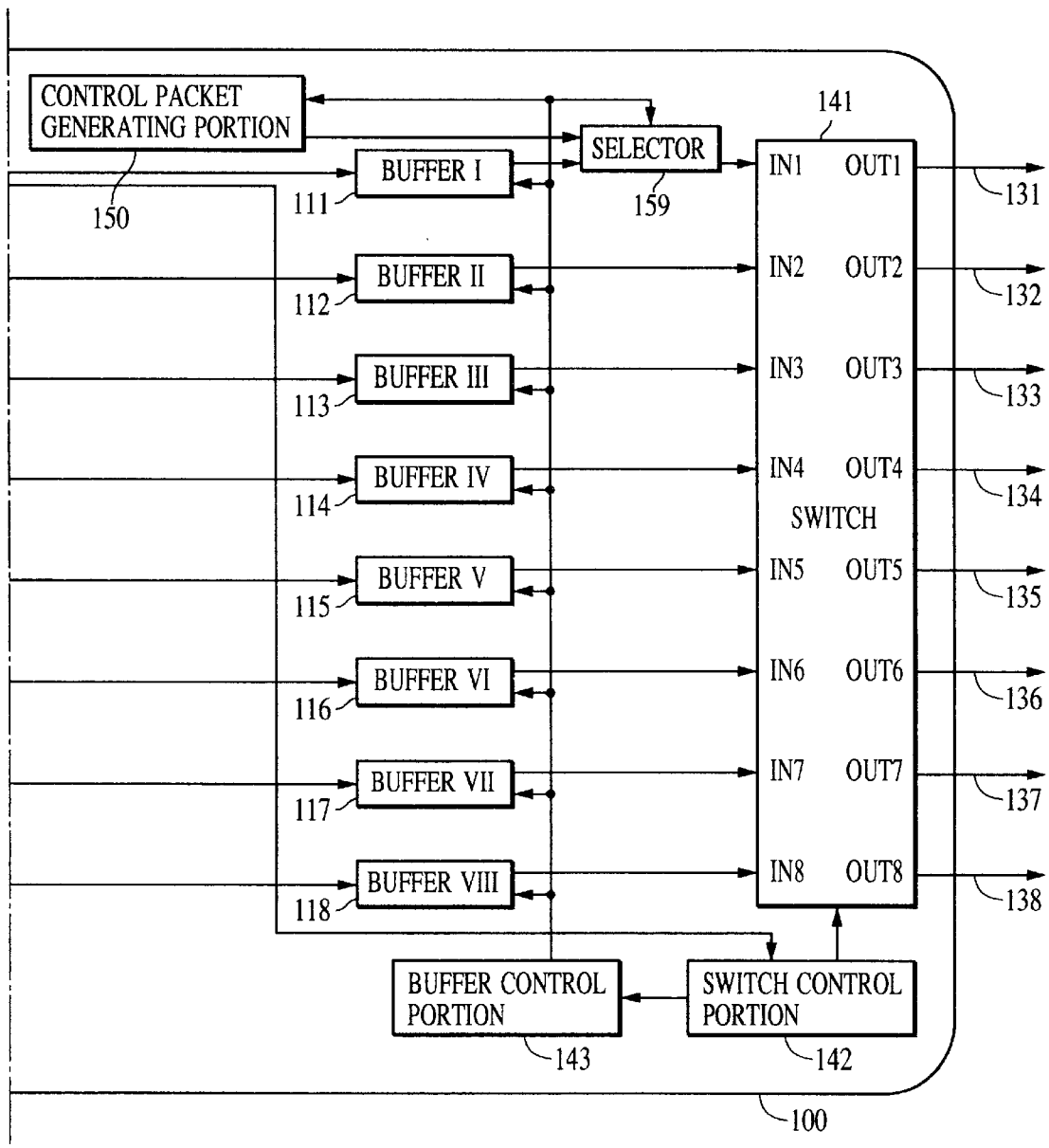

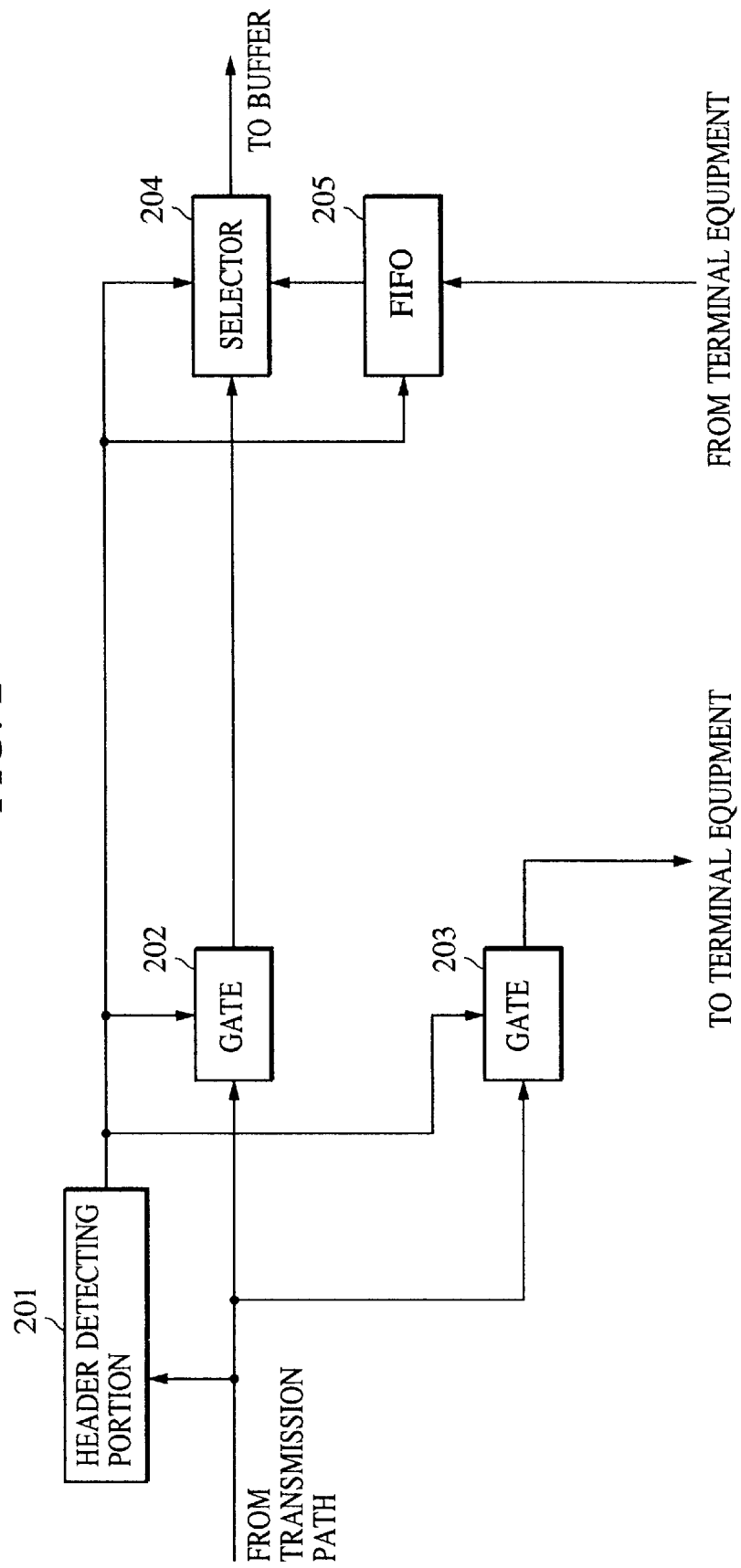

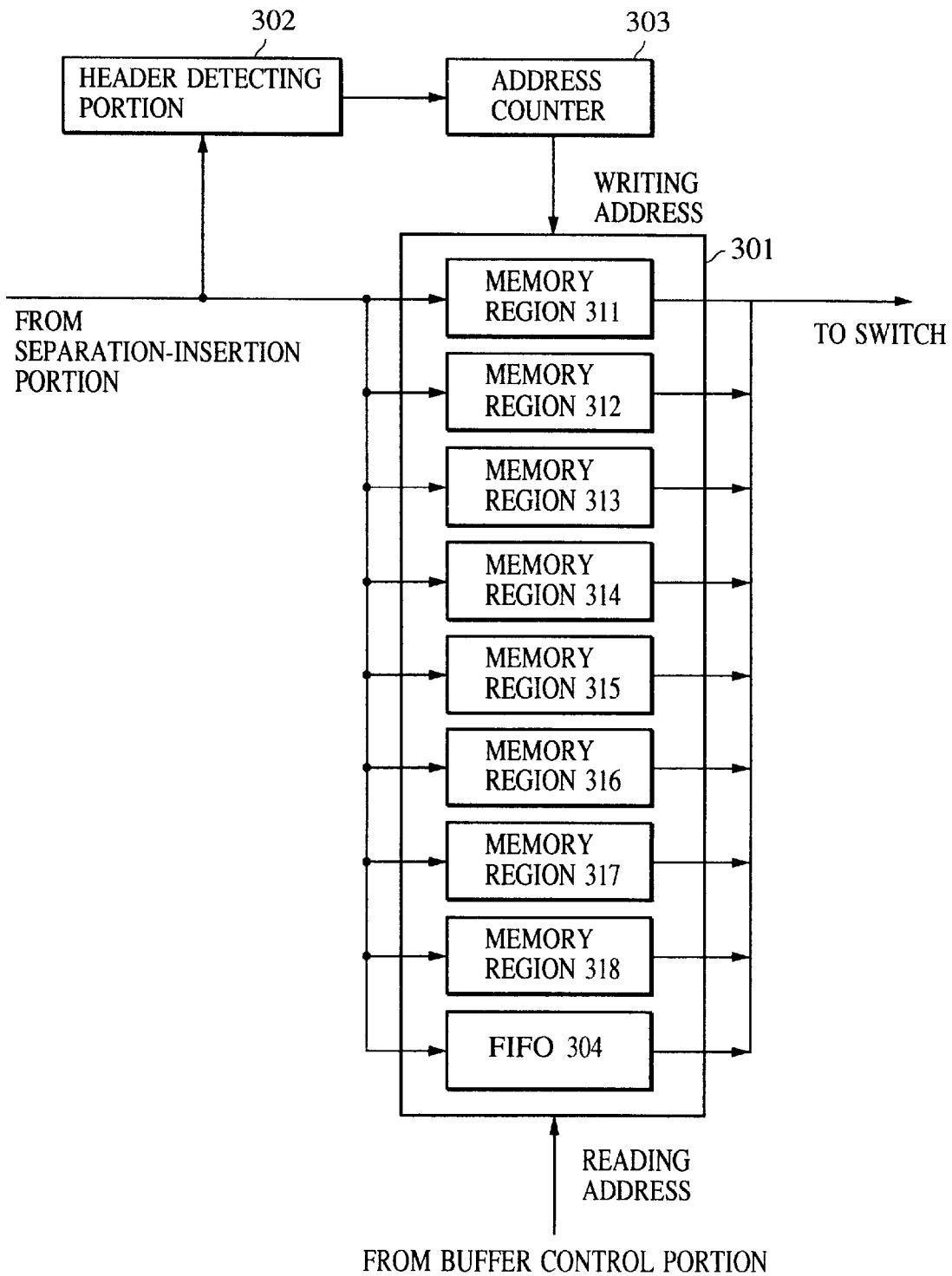

FIG. 4

| CONTROL ADDRESS / INPUT TERMINAL | A1 | A2 | A3 | A4 | A5 | A6 | A7 | A8 |
|---|---|---|---|---|---|---|---|---|
| IN1 | OUT1 $\lambda 1$ | OUT2 $\lambda 2$ | OUT3 $\lambda 3$ | OUT4 $\lambda 4$ | OUT5 $\lambda 5$ | OUT6 $\lambda 6$ | OUT7 $\lambda 7$ | OUT8 $\lambda 8$ |
| IN2 | OUT2 $\lambda 2$ | OUT3 $\lambda 3$ | OUT4 $\lambda 4$ | OUT5 $\lambda 5$ | OUT6 $\lambda 6$ | OUT7 $\lambda 7$ | OUT8 $\lambda 8$ | OUT1 $\lambda 1$ |
| IN3 | OUT3 $\lambda 3$ | OUT4 $\lambda 4$ | OUT5 $\lambda 5$ | OUT6 $\lambda 6$ | OUT7 $\lambda 7$ | OUT8 $\lambda 8$ | OUT1 $\lambda 1$ | OUT2 $\lambda 2$ |
| IN4 | OUT4 $\lambda 4$ | OUT5 $\lambda 5$ | OUT6 $\lambda 6$ | OUT7 $\lambda 7$ | OUT8 $\lambda 8$ | OUT1 $\lambda 1$ | OUT2 $\lambda 2$ | OUT3 $\lambda 3$ |
| IN5 | OUT5 $\lambda 5$ | OUT6 $\lambda 6$ | OUT7 $\lambda 7$ | OUT8 $\lambda 8$ | OUT1 $\lambda 1$ | OUT2 $\lambda 2$ | OUT3 $\lambda 3$ | OUT4 $\lambda 4$ |
| IN6 | OUT6 $\lambda 6$ | OUT7 $\lambda 7$ | OUT8 $\lambda 8$ | OUT1 $\lambda 1$ | OUT2 $\lambda 2$ | OUT3 $\lambda 3$ | OUT4 $\lambda 4$ | OUT5 $\lambda 5$ |
| IN7 | OUT7 $\lambda 7$ | OUT8 $\lambda 8$ | OUT1 $\lambda 1$ | OUT2 $\lambda 2$ | OUT3 $\lambda 3$ | OUT4 $\lambda 4$ | OUT5 $\lambda 5$ | OUT6 $\lambda 6$ |
| IN8 | OUT8 $\lambda 8$ | OUT1 $\lambda 1$ | OUT2 $\lambda 2$ | OUT3 $\lambda 3$ | OUT4 $\lambda 4$ | OUT5 $\lambda 5$ | OUT6 $\lambda 6$ | OUT7 $\lambda 7$ |

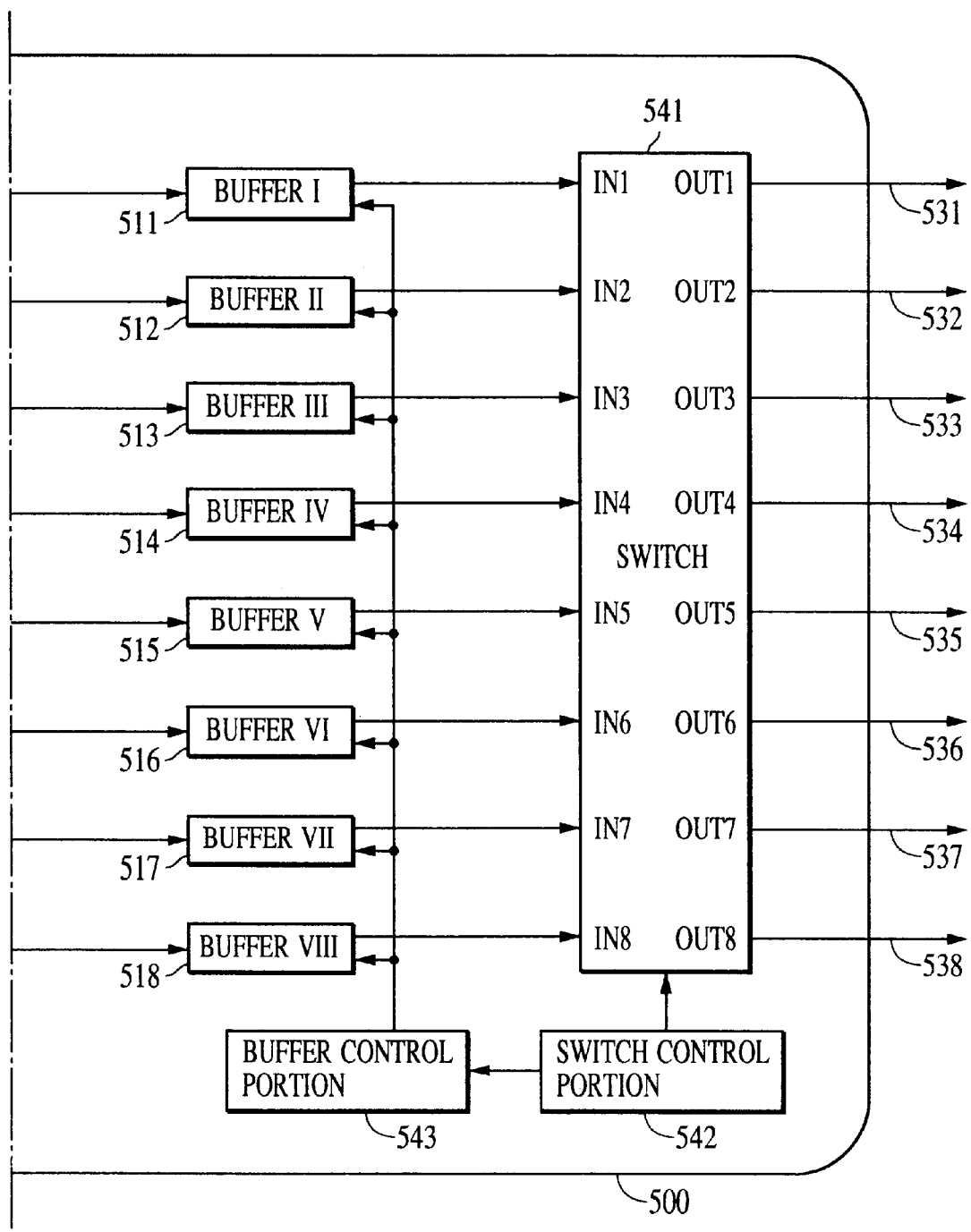

C : CONTROL BIT
B : BROADCAST BIT
N : NODE NO.
T : TRANSMISSION CHANNEL NO.
OTHER : SYNCHRONIZING SIGNAL, ERROR-CORRECTING CODE etc.

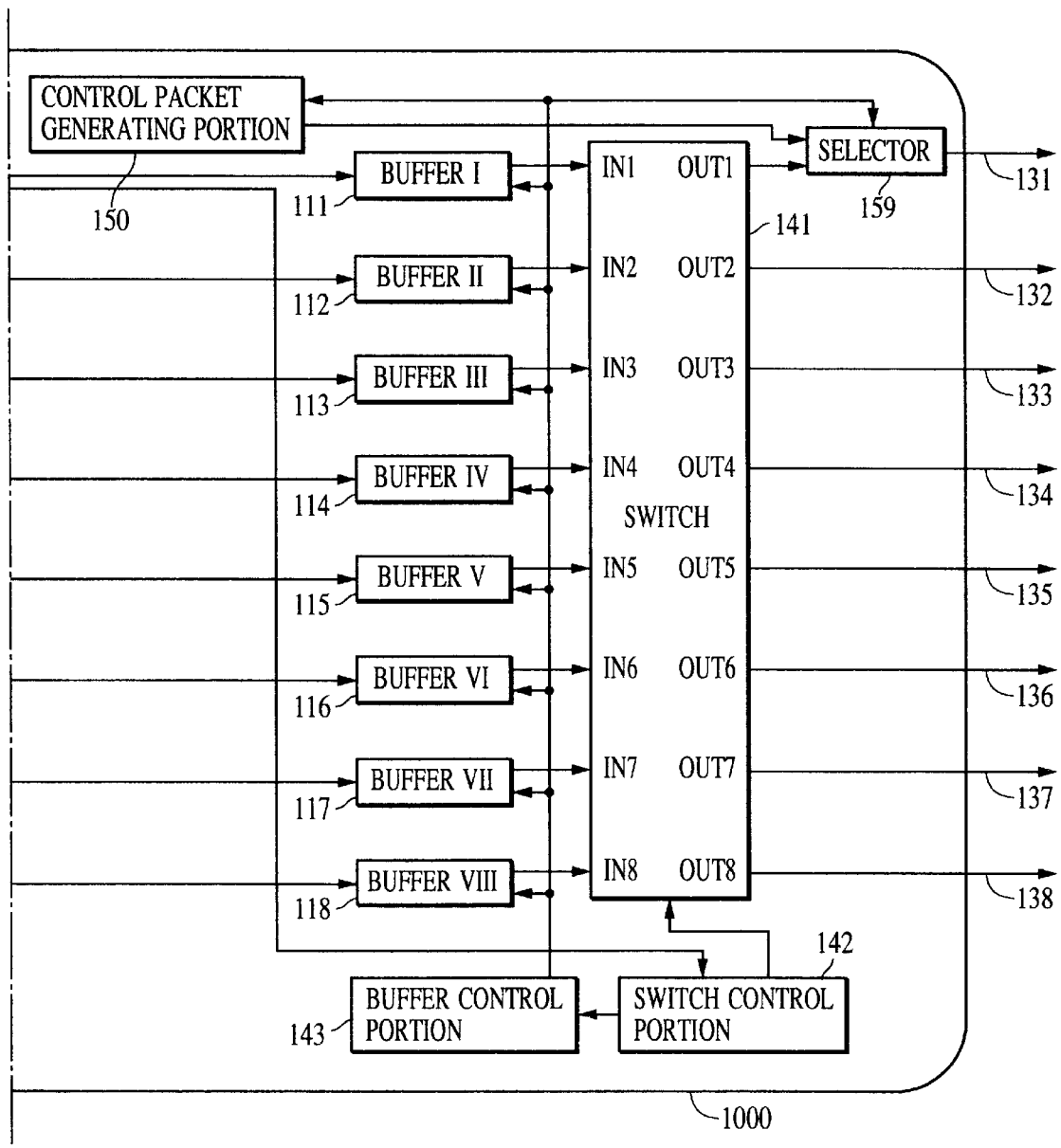

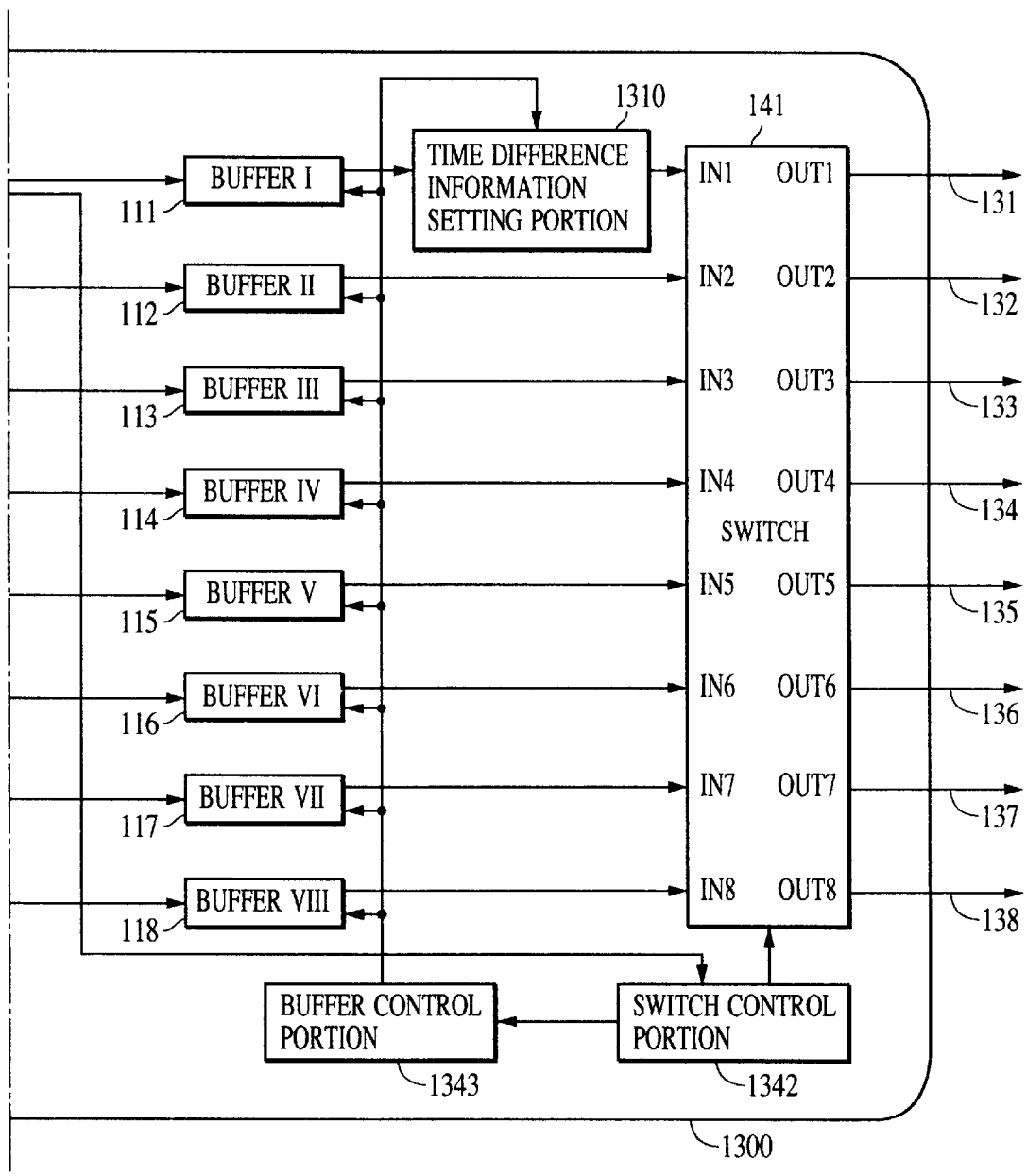

D : TIME DIFFERENCE SETTING BIT
B : BROADCAST BIT
N : NODE NO.
T : TRANSMISSION CHANNEL NO.
OTHER : SYNCHRONIZING SIGNAL, ERROR-CORRECTING CODE etc.

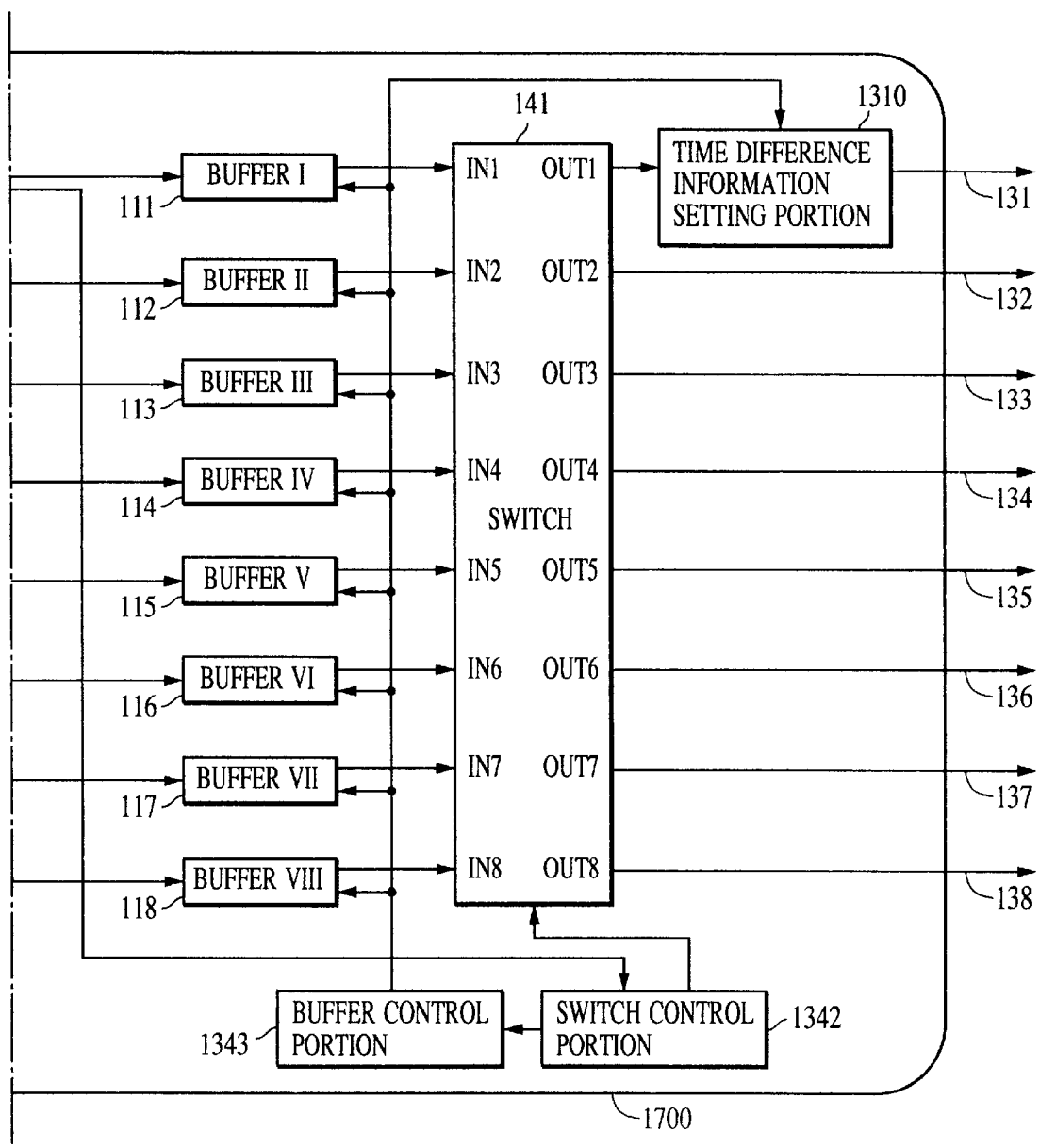

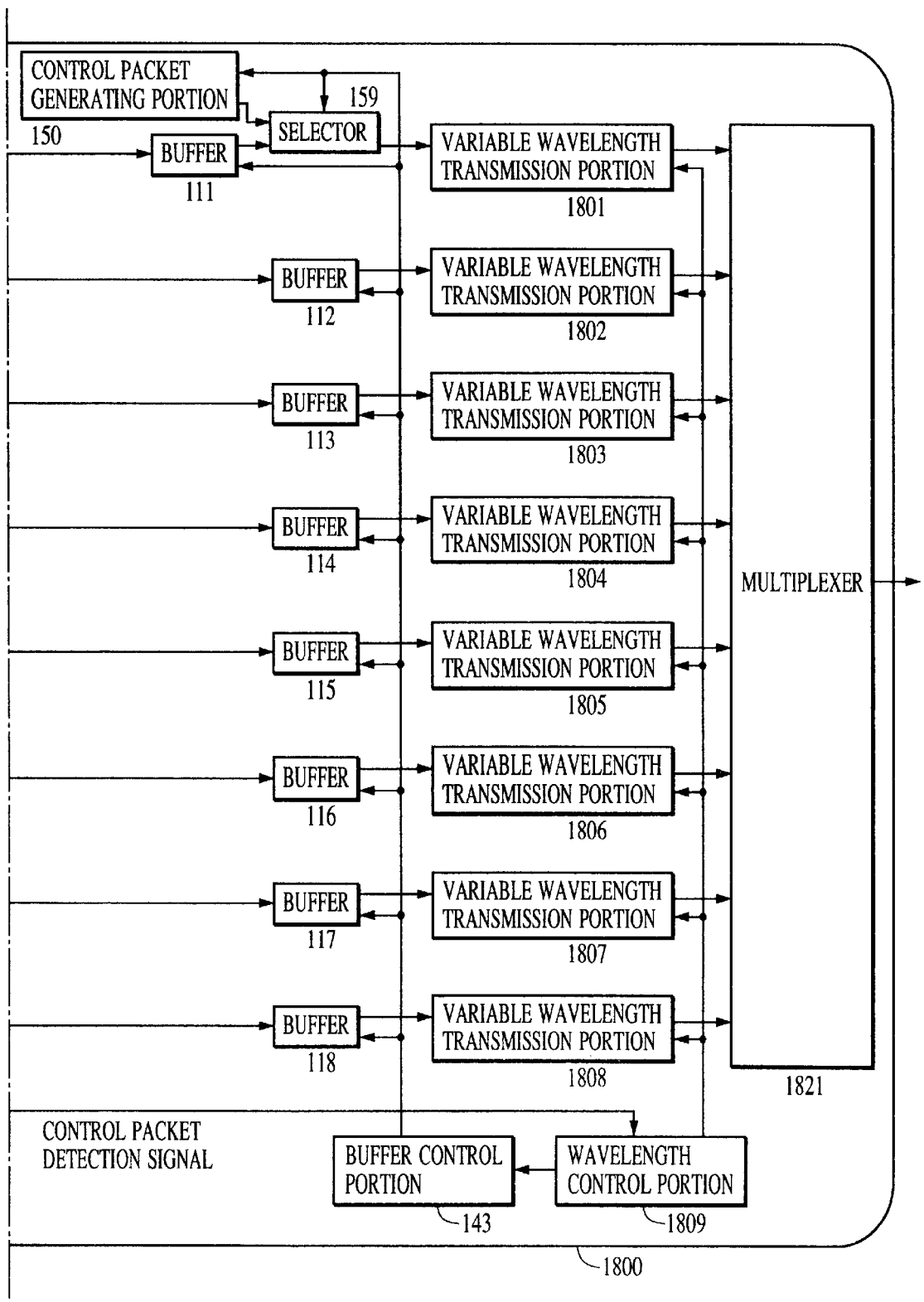

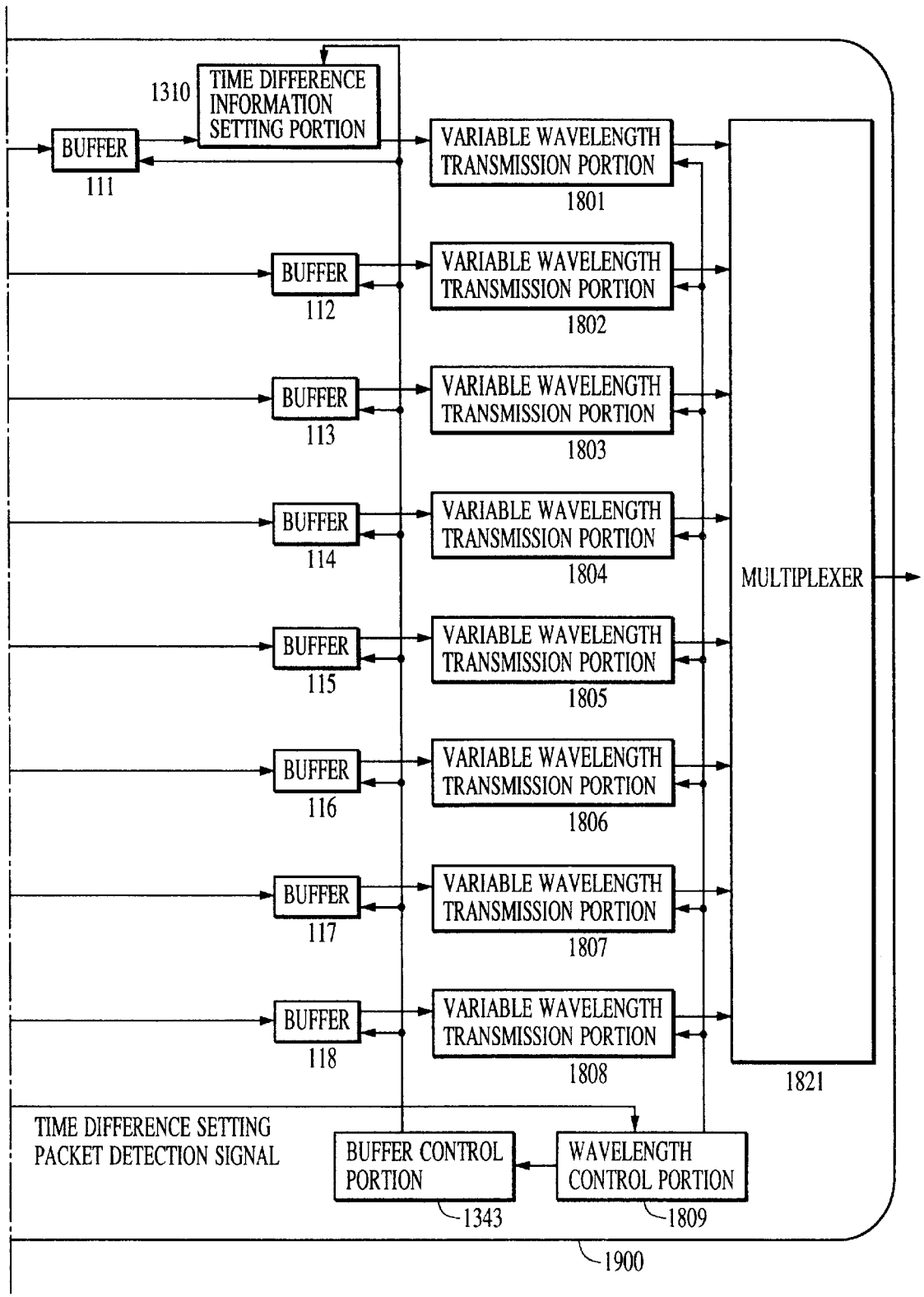

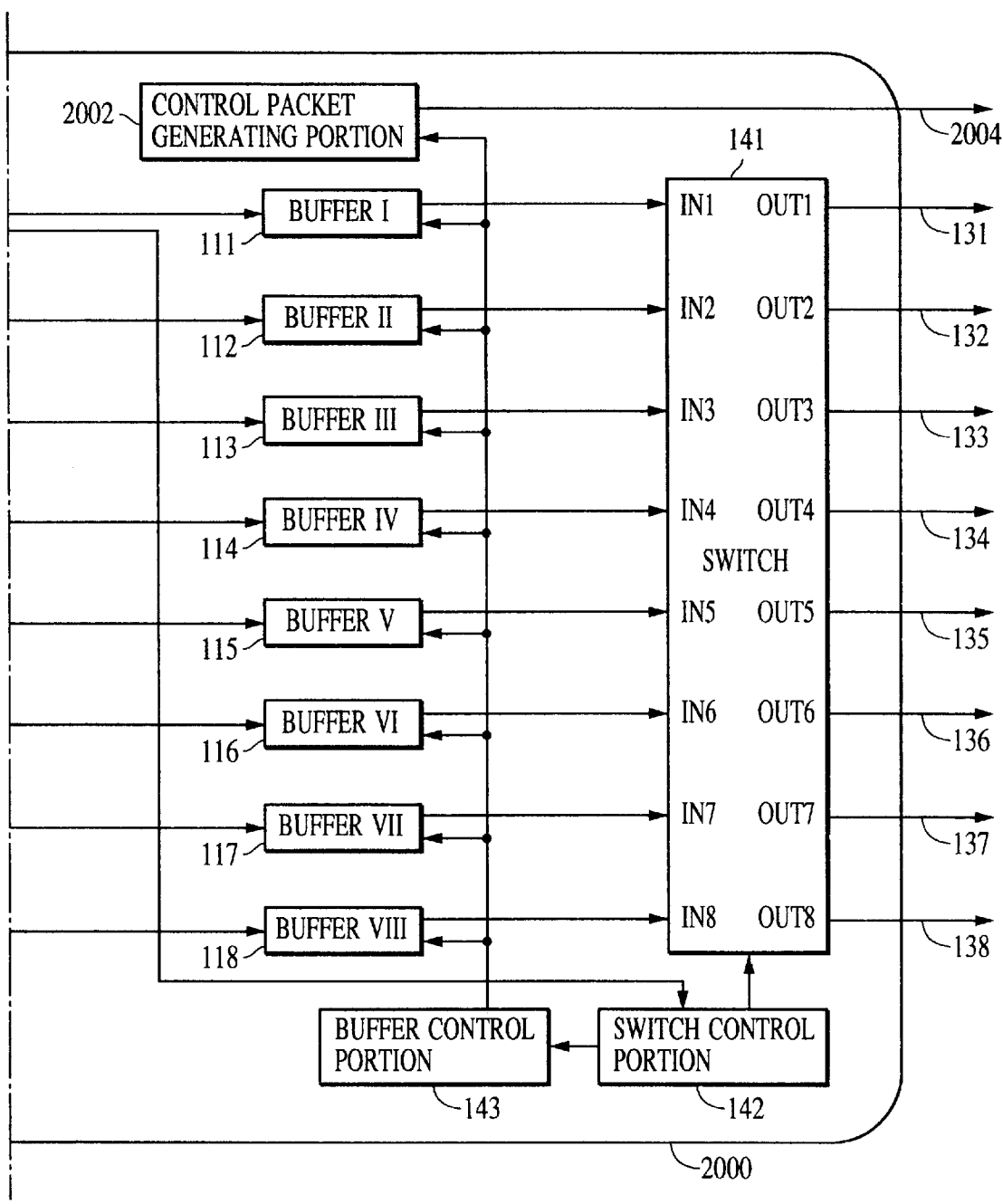

COMMUNICATION NETWORK, AND NODE DEVICE USED THEREIN AND CONTROL METHOD THEREFOR

BACKGROUND OF THE INVENTION

1. Field of the Invention

The present invention relates to a node device for connecting a plurality of pieces terminal equipments, and to a network having a plurality of such node devices, and to a control method therefor.

2. Description of the Related Art

In recent years, to realize a high-speed large-capacity network that connects various pieces terminal equipments and copes with the constant increase in the amount of information, networks having node devices connected by a plurality of parallel transmission paths (or lines) have been studied. Configurations for such networks is disclosed in, for example, Japanese Patent Laid-Open No. 8-237306 Official Gazette. Such a network obviates the necessity for arbitration control by using a connection alteration portion and a variable channel transmission portion to perform a control operation of changing a channel, to which a signal stored in a buffer is permitted to be outputted therefrom, according to a predetermined pattern.

SUMMARY OF THE INVENTION

The present invention is directed to introducing novel control into the aforementioned type of network to thereby improve transmission efficiency. More specifically, in such aforementioned network, in the case that a signal stored in a buffer is outputted by specifying a certain transmission channel, the network is adapted so that the control waits until the buffer has been brought into a state in which the signal can be outputted therefrom to the specified transmission channel. The present invention aims at providing a node device, a network composed of plural node devices, and a control method therefor, whereby, especially, wait (or waiting) time is reduced.

Further, the present invention aims at providing a node device, a network consisting of plural node devices, and a control method therefor, whereby transmission delay is decreased.

Other features, objects and advantages of the present invention will become apparent from the following description of preferred embodiments with reference to the drawings in which like reference characters designate like or corresponding parts throughout several views.

BRIEF DESCRIPTION OF THE DRAWINGS

FIG. 2 is a diagram showing the internal constitution or arrangement of a separation-insertion portion of a node device of a reference example;

FIG. 3 is a diagram showing the internal constitution of a node device of the reference example;

FIG. 4 is a diagram illustrating a control law for buffers and switches (or switching units) of embodiments of the present invention;

DESCRIPTION OF THE PREFERRED EMBODIMENTS

Before describing the preferred embodiments of the present invention in detail, a reference example overlapping with each of the preferred embodiments at a basic part will be described hereinbelow to clarify the present invention.

Figure 5A:
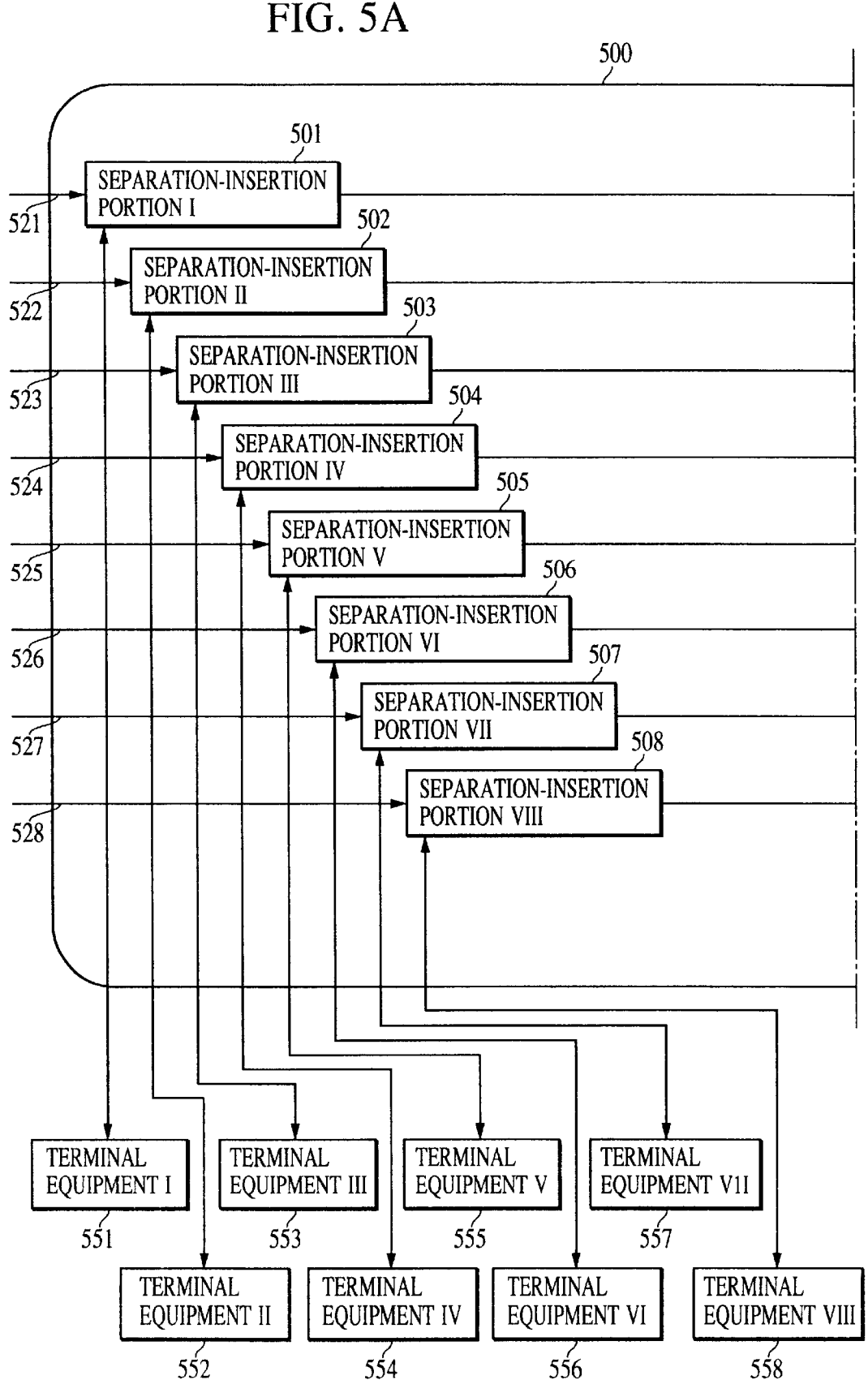
FIG. 5, consisting of FIGS. 5A and 5B, is a diagram illustrating the configuration of a node device of the reference example.

FIG. 5 is a diagram showing the configuration of a node device of a network according to the reference example and illustrates an example wherein pieces of terminal equipment 551 to 558 are connected to the node device 500 through sub-transmission paths.

Reference numerals 501 to 508 designate respective separation-insertion portions. Each of the separation-insertion portions has a function of detecting addresses from packets, which are inputted (or input, or received) from parallel multiplex transmission paths, and separating the inputted packets into packets to be transmitted through the sub-transmission paths to the various units of terminal equipment and packets to be inputted to buffers. Further, each of the separation-insertion portions has another function, of inserting packets transmitted from the units of terminal equipment into a packet flow inputted from the parallel multiplex transmission paths.

Reference numerals 511 to 518 denote buffers. Each of the buffers has a function of temporarily storing packets, which are outputted from the separation-insertion portions, in memory regions respectively corresponding to output terminals of a switch 541 or in FIFO (First In First Out) (memory) connected to a given output terminal of the switch 541.

Reference numerals 521 to 528 and 531 to 538 represent parallel multiplex transmission paths for connecting nodes (or node devices). The transmission paths are constituted by, for example, a plurality of spatially separated optical fiber transmission paths or by wavelength division multiplexing transmission paths that are realized on a single optical fiber by performing wavelength division multiplexing.

Reference numeral 541 designates a switch for connecting packets, each of which is inputted to one of input terminals IN1 to IN8, to a given one of output terminals OUT1 to OUT8 under the control of a switch control portion 542. When a plurality of optical fiber transmission paths are used as the parallel multiplex transmission paths, the switch 541 performs switching by using a space switch or the like. When wavelength division multiplexing transmission paths are used, a switch is configured between nodes by connecting a transmission portion, which has a configuration slightly differing from the configuration illustrated in this figure and which consists of a plurality of variable wavelength laser diodes and a multiplexer, to the wavelength division multiplexing transmission paths and by then separating a packet into signals of (predetermined) wavelengths at reception portions corresponding to the wavelength division multiplexing transmission paths by means of demultiplexers, respectively. Such a switch performs switching by setting the transmitting wavelength of each of the variable wavelength laser diodes at a given one of the wavelengths λ1 to λ8.

Reference numeral 542 denotes a switch control portion that is operative to control the switch according to, for instance, a connection table illustrated in FIG. 4. Reference numeral 543 denotes a buffer control portion that is operative to control the buffers so that a packet stored in each of the buffers is read therefrom when one of the input terminals of the switch, which is connected to a given one of the buffers, is connected to a predetermined one of the output terminals thereof.

The following description will focus especially on parts relating to broadcast communication. Broadcast communication is defined herein as communication by which a packet is simultaneously transmitted to a plurality of pieces of terminal equipment (sometimes, all of the terminal equipment) connected to a network.

Figure 11:
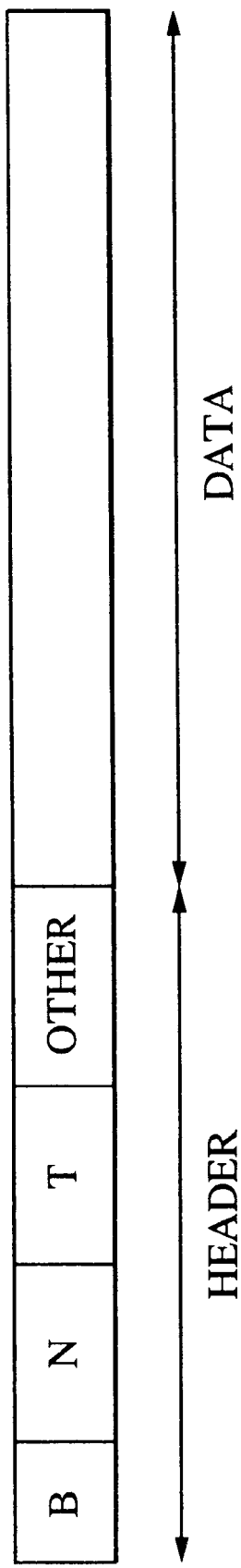
FIG. 11 is a diagram illustrating the format of a packet used in a network of the reference example.

FIG. 11 is a diagram illustrating the format of a packet used in the network of the reference example. In this figure, reference character B represents a broadcast bit which is set to 1 at the time of performing a broadcast communication and is set to 0 otherwise. Reference character N denotes a node number (No.). If 32 node devices are connected in the network, a field representing the node number, which ranges from 1 to 32, is composed of 5 bits. Reference character T represents a transmission channel number (No.). If the number of transmission channels of the parallel multiplex transmission path (that is, a multiplexing number (or multiplicity)) is 8, a field (or segment) representing the transmission channel number, which ranges from 1 to 8, is composed of 3 bits. In a field "OTHER", a synchronizing signal, an error-correcting code or the like is inserted as needed.

FIG. 2 shows the internal constitution of each of the separation-insertion portions 501 to 508. Reference numeral 201 designates a header detecting portion for detecting a destination address from a header of a packet. Reference numerals 202 and 203 denote gates for outputting or cutting off signals. Reference numeral 204 indicates a selector for outputting one of two input signals. Reference numeral 205 designates a FIFO (First In First Out) register for temporarily storing a packet. In each of the separation-insertion portions 501 to 508, the header is detected by the header detecting portion 201 from a packet inputted from the parallel multiplex transmission path. Then, the enabling and disabling of the gates 202 and 203 are performed according to information included in the header.

In the header detecting portion 201, the header (thus, the bits B and N) is detected from a packet inputted from the transmission path. Subsequently, the enabling and disabling of the gates 202 and 203 are performed according to information contained in the header.

In the header detecting portion 201, a number (hereunder referred to simply as an "own-node number") assigned to the node device (hereunder referred to as an "own-node") having this header detecting portion is preliminarily stored.

The header detecting portion 201 controls the routing of the packet as follows.

1-1. When the detected node number is matched with the own node number, the header detecting portion 201 enables the gate 203 and disables the gate 202, thereby to output the packet only to the terminal equipment.

1-2. When the detected node number does not match the own-node number and the B-bit is 0, the header detecting portion 201 enables the gate 202 and disables the gate 203, thereby to output the packet only to the selector 204.

1-3. When the detected node number does not match the own-node number and the B-bit is 1, the header detecting portion 201 enables both of the gates 202 and 203, thereby to output the packet to the terminal equipment and the selector 204.

Incidentally, among the aforementioned operations 1-1 to 1-3, only the operations 1-1 and 1-3 relate to broadcast communication.

On the other hand, a packet transmitted from the terminal equipment is tentatively stored in FIFO 205. Thereafter, when there is room (a vacant portion) in a packet flow inputted from the gate 202 to the selector 204, the packet is read from FIFO 205 and is then transmitted to the buffer through the selector 204.

FIG. 3 shows the internal constitution of each of the buffers 511 to 518. Reference numeral 301 designates a buffer memory consisting of memory regions 311–318 and FIFO memory 304, which respectively correspond to the output terminals of the switch 541. Reference numeral 302 denotes a header detecting portion for detecting the B-bit, N-bit and T-bit from the header of a packet. Reference numeral 303 represents an address counter for supplying a writing address to the buffer memory 301. The memory regions of the buffer memory 301 respectively have input terminals which are independent of one another so that data can be written to the plural memory regions simultaneously. In each of the buffers 511 to 518, a header is detected by the header detecting portion 302 from a packet inputted from the separation-insertion portion. Then, the memory region to be used to store the packet is determined according to information included in the header.

The header detecting portion 302 preliminarily stores the own node number assigned to the own node, a node number (hereunder referred to as a downstream node number) of an adjoining downstream node (device), and the transmission channel number of a parallel multiplex transmission path to be connected to each of the buffers through the separation-insertion portion.

The header detecting portion 302 controls the routing of the packet as follows.

2-1. When the detected node number matchs the downstream node number and the B-bit is 0, the header detecting portion 302 designates or specifies the memory region having the same number as the detected transmission channel number (i.e., one of the memory regions 311 to 318). Further, the header detecting portion 302 causes the address counter 303 to generate a writing address. The header detecting portion 302 then causes the buffer memory 301 to store the packet at the above-mentioned writing address.

2-2. When the detected node number does not match the downstream node number and the B-bit is 0, the header detecting portion 302 causes FIFO 304 to store the packet.

2-3. When the detected node number matches the downstream node number and the B-bit is 1, the header detecting portion 302 causes the address counter 303 to generate a writing address. The header detecting portion 302 then causes all of the memory regions 311 to 318 simultaneously to store the packet at the generated writing address.

2-4. When the detected node number does not match the downstream node number and the B-bit is 1, the header detecting portion 302 causes the address counter 303 to generate a writing address. The header detecting portion 302 then causes the memory region having the same number as the detected transmission channel number (i.e., one of the memory regions 311 to 318) to store the packet at the generated writing address.

Incidentally, among the aforementioned operations 2-1 to 2-4, only the operations 2-3 and 2-4 relate to broadcast communication.

The switch 541 is operative to connect each packet inputted to one of the input terminals IN1 to IN8, to a given one of the output terminals OUT1 to OUT8 in accordance with the connection table of FIG. 4. Thus, the switch 541 periodically and sequentially changes control addresses A1, A2, A3, A4, A5, A6, A7 and A8. Thus, the switch 541 first connects a signal, which is inputted to the input terminal IN1 thereof, to the output terminal OUT1 and then connects this signal to the output terminal OUT2 and thereafter connects this signal to the output terminals OUT3, OUT4, OUT5, OUT6, OUT7 and OUT8 in succession. Similarly, a signal inputted to the input terminal IN2 is repeatedly connected to the output terminals OUT2, OUT3, OUT4, OUT5, OUT6, OUT7, OUT8 and OUT1 in this order. This is the same with signals inputted to the terminals IN3 to IN8. A connection time, that is, a period of time during which, for example, the input terminal IN1 is connected to the output terminal OUT1 (similarly, the input terminals IN2, ..., IN8 are connected to the output terminals OUT2, ..., OUT8, respectively) should be set at an integral multiple of a packet length. For simplicity of description, it is assumed herein that each of the connection times T1, T2, T3, T4, T5, T6, T7 and T8 respectively corresponding to the input terminals IN1, IN2, ... IN8 is set as a time required for reading 1 packet from the corresponding one of the buffers 511 to 518.

Incidentally, as is apparent from FIG. 4, the switch 541 changes the connections between the input terminals IN1 to IN8 and the output terminals OUT1 to OUT8 in accordance with the predetermined pattern established so that packets are not concurrently outputted to the same transmission channel.

Figure 12:
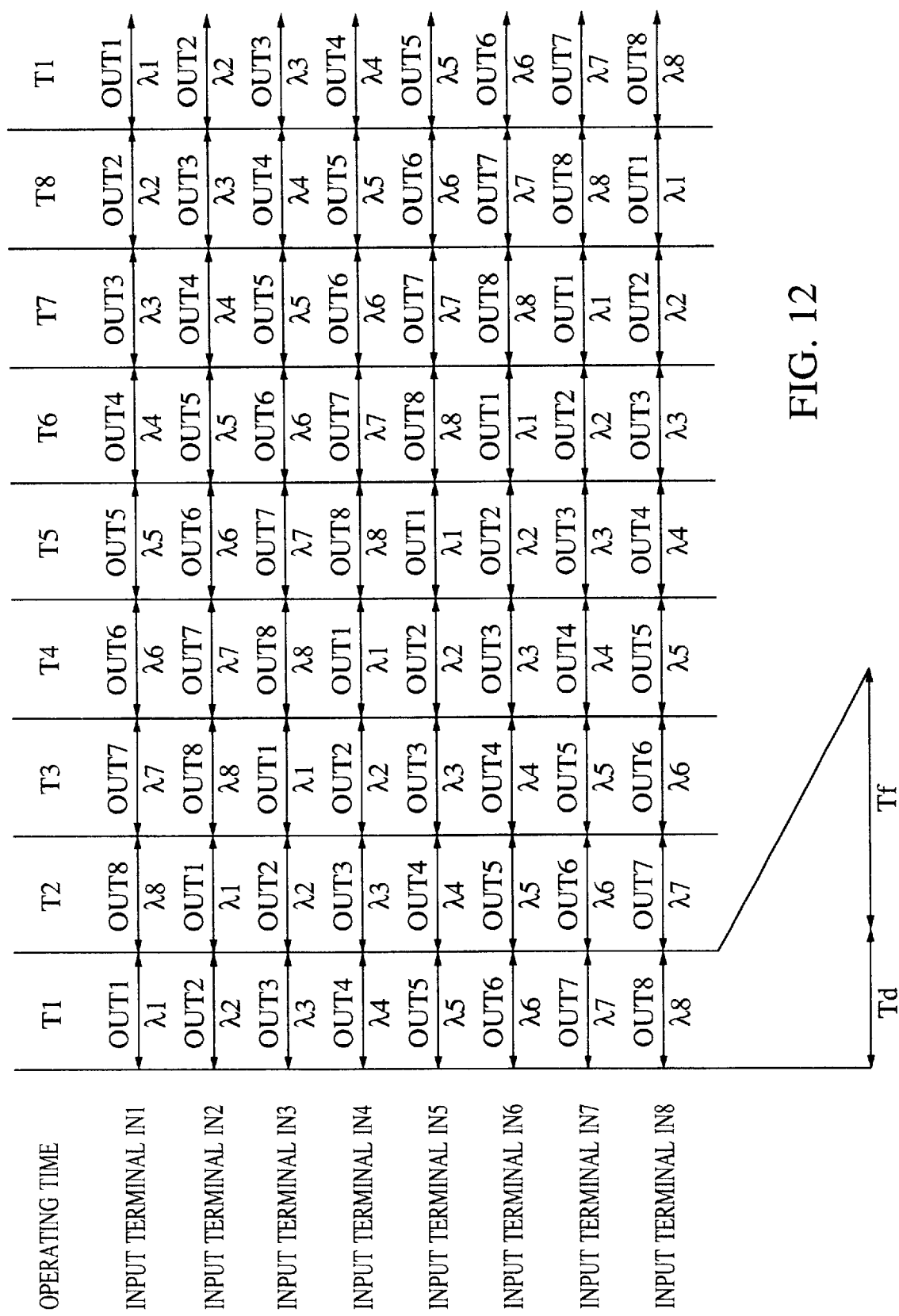
FIG. 12 is a diagram chronologically illustrating the control law for the buffers and switches of the embodiments of the present invention.

FIG. 12 chronologically illustrates an operation performed by the switch 541 according to the connection table of FIG. 4. That is, the operation of the switch 541 consists of steps to be performed in eight consecutive operation (or operating) periods T1, T2, T3, T4, T5, T6, T7 and T8, respectively. Further, each of these eight operating periods is divided into a reading period Td, during which packets are read from the memory regions 311 to 318, and a reading period Tf, during which a packet is read from FIFO memory 304, according to actions performed in the buffers 511 to 518. Incidentally, as described above, for simplicity of description, it is assumed herein that T1=T2=T3=T4=T5=T6=T7=T8=a time required for reading 1 packet (=T(SW)) and that a packet is read from FIFO when no packets to be read are stored in the memory regions 311 to 318.

Figure 6:
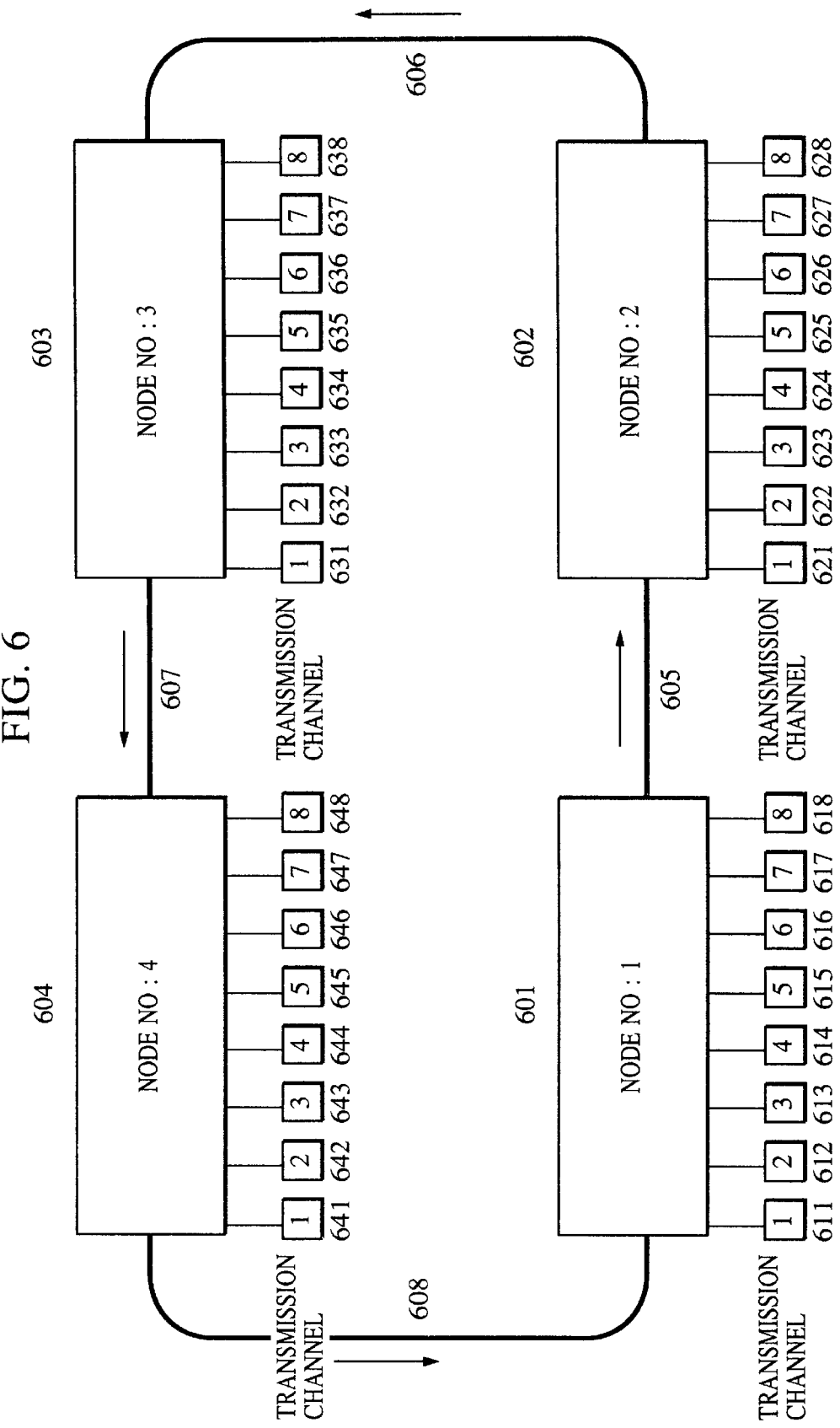
FIG. 6 is a diagram showing the configuration of a network according to the first embodiment of the present invention.

FIG. 6 shows the configuration of an example of a network system using the node device shown in FIG. 5. In this network system, four node devices 601 to 604 are connected through parallel multiplex transmission paths 605 to 608 in a ring topology (or pattern). Eight terminal equipment units are connected to each of the node devices through eight sub-transmission paths. A group of terminal equipment units 611 to 618 is equivalent to a group of the units of terminal equipment units 551 to 558. Similarly, groups of terminal equipment units 621 to 628, terminal equipment 631 to 638 and terminal equipment 641 to 648 are equivalent to the group of the terminal equipment units 551 to 558.

Figure 7:
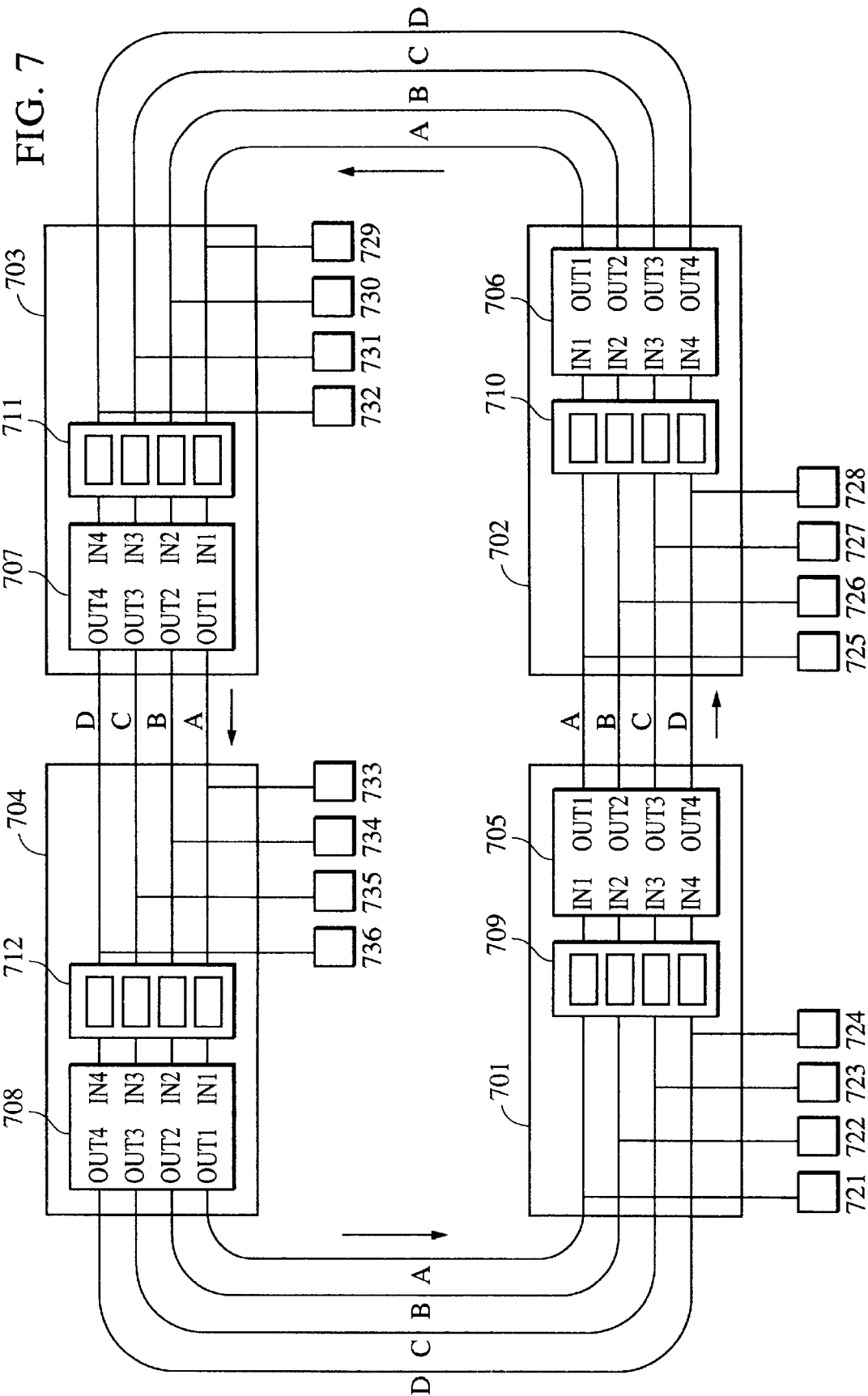
FIG. 7 is a diagram illustrating the communication principle for a network according to this embodiment of the present invention.

FIG. 7 is a diagram for illustrating the communication principle for this network. Reference numerals 701 to 704 designate node devices. Reference numerals 705 to 708 denote exchange switches that are equivalent to switch 541. Reference numerals 709 to 712 designate buffers that are equivalent to the group of buffers 511 to 518. Reference numerals 721 to 736 represent terminal equipment. Reference characters A, B, C and D denote parallel transmission paths respectively forming rings.

First, the communication principle of this network will be described by referring to FIG. 7. This network has a plurality of rings A, B, C and D that are connected to one another by the exchange switches 705 to 708. When a piece of terminal equipment communicates with terminal equipment connected to a different ring, the former terminal equipment is switched to this ring at least once by a given exchange switch. Thus, such a communication is achieved. Although the place at which the switching is performed, is not specified, the communication control is facilitated by changing the currently used transmission path to a destination transmission path at the node that immediately precedes a destination node, and to a given one of the transmission paths at other nodes. In this network, in order to simplify the node devices, the switching is performed as follows. The exchange switches 705 to 708 are adapted to change the connection relation between the input and output terminals according to the predetermined connection table at a constant period regardless of input signals. Then, input signals are temporarily stored in the buffers 709 to 712. When the connection relation between the input and output terminals of the exchange switch is appropriate to the packed in the buffer, that packet is read from the buffer.

For example, when a packet is communicated from terminal equipment 722 to terminal equipment 732, the packet outputted from terminal equipment 722 is stored in the buffer 709 of the node (device) 701. When the input terminal IN2 of switch 705 is connected to the output terminal OUT2, the packet is read from buffer 709 and is outputted to the transmission path B. Subsequently, the packet is inputted to the buffer 710 of the node (device) 702. Then, when the input terminal IN2 of switch 706 is connected to the output terminal OUT4 thereof, the packet is read from buffer 710 and is outputted to the transmission path D. Thus, the packet is sent to the terminal equipment 732.

In this way, a communication is performed by changing the currently used transmission path to an arbitrary ring transmission path in each of the node devices.

Next, broadcast communication will be described by referring to FIGS. 5 and 6. In the following description, it is assumed that the parallel multiplex transmission paths are a plurality of spatially separated optical fiber transmission paths and that the switches are space switches. However, even in the case of using wavelength division multiplexing transmission paths, similar operation is performed according to the aforementioned principle. An operation of performing a broadcast communication between terminal equipment 611 and the other terminal equipment of the entire network will be described hereinbelow by way of example.

3-1. First, in terminal equipment 611, the own-node number and the transmission channel number (for instance, N=1, T=1) are written to the header of a packet. Also, in this header, the B-bit is set to 1. Thereafter, the packet is transmitted from this terminal equipment. The packet is then inputted to the separation-insertion portion 501 of node device 601 through the sub-transmission path.

3-2. In the selector 204 of the separation-insertion portion 501, the packet transmitted from the terminal equipment 611 is inserted into a vacant portion in a packet flow transmitted from the transmission path. Then, the packet flow is transmitted to the buffer 511.

3-3. When the header detecting portion 302 of the buffer 511 detects the header of the inputted packet, the detecting portion 302 designates all of the memory regions 311 to 318 because the B-bit is 1 and the detected node number matches the own-node number (N=1) stored therein. The writing address counter 303 receives information indicating such designation and generates a writing address. Subsequently, the packet is simultaneously written to all of the memory regions 311 to 318.

3-4. The switch control portion 542 controls the connection relation between the input and output terminals of the switch 541 according to the table of FIG. 4 so that the control addresses A1 to A8 circulate, or cycle, at a constant period. Further, the switch control portion 542 transmits the control addresses to the buffer control portion 543. When the address A1 is supplied to the buffer control portion 543, this control portion 543 controls the buffer 511 so that a broadcast packet (namely, a packet for broadcasting) is read from the memory region 311 thereof. When the address A2 is supplied thereto, the buffer control portion 543 controls the buffer 511 so that a broadcast packet is read from the memory region 312 thereof. Similarly, when each of the addresses A3 to A8 is supplied thereto, the buffer control portion 543 controls the buffer 511 so that a broadcast packet is read from a corresponding one of the memory regions 313 to 318 thereof. Thus, the broadcast packets sequentially read from the buffer 511 are inputted to the switch 541 from the input terminal IN1 and are then outputted from all of the output terminals OUT1 to OUT8 to the transmission paths 531 to 538 in sequence.

3-5. The eight packets outputted from the node device 601 are inputted to the separation-insertion portions 501 to 508 of the node device 602 through the parallel multiplex transmission paths. Then, the headers of the packets are detected in the header detecting portion 202. The detected node number (N=1) does not match the stored own-node number (N=2). Further, the B-bit is 1. Thus, both of the gates 202 and 203 are enabled, so that the packets are outputted to the various units of terminal equipment and the selector 204.

3-6. The packets outputted from the separation-insertion portions 501 to 508 are transmitted to the terminal equipments 621 to 628. On the other hand, the packet outputted to the selector 204 is inputted to each of the buffers 511 to 518 therethrough.

3-7. When the header detecting portion 302 detects the header, the packet is stored in the memory region having the same number as the stored transmission channel number because the B-bit is 1 and the detected node number (N=1) does not match the own-node number (N=2). Thus, in the buffer 511, the packet is stored in the memory region 311. Further, in the buffer 512, the packet is stored in the memory region 312. Similarly, in the buffers 513 to 518, the packets are stored in the memory regions 313 to 318, respectively.

3-8. The packet stored in each of the buffers is read only in the case of the control address A1. Further, the broadcast packet inputted from the transmission path 521 is outputted to the transmission path 531. Moreover, the broadcast packet inputted from the transmission path 522 is outputted to the transmission path 532. Likewise, the broadcast packets inputted from the transmission paths 523 to 528 are outputted to the transmission paths 533 to 538, respectively.

3-9. Similarly, signals are distributed by the node devices 603 and 604 to the group of the terminal equipments 631 to 638 and the group of the terminal equipments 641 to 648. Moreover, the signals are passed (or relayed) and inputted to the node device 601.

3-10. When the header of the packet is detected, each of the separation-insertion portions of the node device 601 enables the gate 203 and disables the gate 202 because the detected node number matches the stored node number. Thus the separation-insertion portions output the packets only to the units of terminal equipment.

3-11. The packets outputted from each of the separation-insertion portions 501 to 508 to the various terminal equipment are transmitted to the terminal equipment units 611 to 618 through the sub-transmission paths. Therefore, the packets are transmitted to all of the terminal equipments on the network.

Thus, when a broadcast communication is performed, eight copies of a broadcast packet are obtained in the (transmitting) node device connected to a transmitting terminal equipment, which transmits the broadcast packet thereto, and are then transmitted to the eight rings. Moreover, each of the copied broadcast packets is transmitted on the corresponding ring in such a manner as not to migrate to another ring. Finally, the transmission of the copied broadcast packet is terminated at the transmitting node device.

Now, the transmission delay in the case of performing broadcast communication in the aforementioned network will be described.

For simplicity of description, the network is assumed to be in an idle (or vacant) state, so that the influence of other packets may be neglected. subject to this condition, transmission delay times respectively required in the following cases (a) and (b) are obtained:

(a) Packets are transmitted from the terminal equipment 611 to the entire network by performing broadcast communication, and a packet is transmitted to one of the terminal equipments belonging to the node device 601 (incidentally, a transmission route is established as one round of the network).

(b) Packets are transmitted from the terminal equipment 611 to one of the units of terminal equipment belonging to the node device 601 by performing one-to-one communication (similarly, a transmission route is established as one round of the network).

First, the transmission delay time in the aforementioned case (a) (utilizing the broadcast communication) is obtained as follows. The problem raised in this case is that the packet stored in each of the buffers of the node devices 602, 603 and 604 is read out only in the case of the control address A1, as described above in the step 3-8 of the broadcast communication procedure. Although the connection table (see FIG. 4) concerning the connection in each of the node devices has been described in the description of the reference example, the relation among the connection tables respectively corresponding to the node devices is not controlled in the reference example: the control address to be used by the switch control portion of the node device 602 (or 603 or 604) during the operation of the switch control portion of the node device 601 at the control address A1 is not controlled in particular. Therefore, for example, the switches of the node devices may change the state thereof in synchronization with one another according to the connection table of FIG. 4. Hereunder, consider such a case, namely, the case that the control portions of the node devices 602, 603 and 604 operate by using the control address A1 when the switch control portion of the node device 601 operates by using the address A1 and that the control address is changed by the node devices in synchronization with one another.

In the aforementioned case (a), the packet outputted from terminal equipment 611 reaches the buffer 511 via the separation-insertion portion 501 of the node device 601. The packet is concurrently written to all of the memory regions 311 to 318. Thus, no matter what control address is used by the switch 541, the packet can be read from any of the memory regions. At every change of the control address, the packet is read from the memory regions. Further, because the network is assumed to be in the idle state, the packet is read by the switch 541 just after this packet is written to the buffer 511. For instance, if a first packet is outputted from the terminal OUT1 of the switch 541 to the transmission path 531 when the current control address is A1, a packet is outputted from the terminal OUT2 of the switch 541 to the transmission path 532 when the current control address is the next control address A2. Packets are similarly outputted each time when the current control address changes from A3 to A7. Thus, a final packet is outputted from the terminal OUT8 of the switch 541 to the transmission path OUT8 when the current control address is A8. Therefore, the duration of the stay of a packet in the node device 601 is T(SW) in the case of the packet outputted therefrom at the earliest time. Further, the duration of the stay of a packet therein is 8×T(SW) in the case of the packet last outputted therefrom.

Regarding the node device 602, consider, especially, a packet inputted from the transmission channel 521 thereto (namely, a packet first outputted from the node device 601). When a packet outputted from the terminal OUT1 of the switch 541 of the node device 601 in the case, in which the control address has been A1, reaches the buffer 511 of the node device 602, the control address is changed to A2. As described above, if a broadcast communication is performed, then only when the control address is A1, a packet is read from each of the buffers in the node devices (in this case, the node devices 602, 603 and 604) other than the node device connected to the terminal equipment which has transmitted the packet. Thus, during a certain time period (namely, 7×T(SW)), the reading of a packet from the buffer is not performed until the next time the control address becomes A1. Thereafter, the packet is read from the buffer during the time period T(SW). Therefore, the duration of the stay of a packet in one node device is 8×T(SW). Even in the case of using other transmission channels, a packet is read from the buffer only when the control address is A1. Thus, this packet is outputted therefrom simultaneously with the outputting of the packet to the transmission channel 521. Alternatively, the former packet is outputted when the control address becomes A1 after the elapse of one more period or cycle.

Subsequently, when the packet outputted from the terminal OUT1 of the switch 541 of the node device 601 in the case, in which the control address has been A1, reaches the buffer 511 of the node device 602, the control address is changed to A2. As described above, if a broadcast communication is performed, only when the control address is A1, a packet is read from each of the buffers. Thus, during a time period (namely, 7×T(SW)), the reading of a packet from the buffer is not performed until the control address becomes A1 next time. Thereafter, the packet is read from the buffer during the time period T(SW). Therefore, the duration of the stay of a packet in one node device is 8×T(SW). This is the same with the case of the node device 604.

Namely, in the case of performing broadcast communication, the time taken by a packet to make one round of the network of FIG. 6 is T(SW)+3×8×T(SW)=25×T(SW) even when using the fastest transmission channel. In contrast, when using the slowest transmission channel, the time taken by a packet to make one round of such a network is 33×T(SW) obtained by adding the time taken by the control address to circulate one time, to 25×T(SW).

On the other hand, consider the aforementioned case (b) (utilizing a one-to-one communication). A packet outputted from terminal equipment 611 reaches the buffer 511 via the separation-insertion portion 501 of the node device 601. In the buffer 511, the packet is written to FIFO 304. Thus, the packet can be read from this buffer whatever control address may be used at that time. Further, because the network is assumed to be in the idle state, the switch 541 reads the packet by spending T(SW) immediately after this packet is written to the buffer 511. Therefore, the duration of the stay of a packet in the node device 601 is T(SW). This is the same with the case of the node devices 602 and 603.

In the node device 604, a packet should be outputted from the terminal OUT2 of the switch 541. Thus, the time period during which the reading of the packet from a buffer (incidentally, it is not definitely preliminarily determined which one of the buffers 511 to 518 the packet will reach) should wait, varies depending upon a time at which the packet reaches the buffer. Therefore, at worst, the reading of the packet from the buffer should wait 7×T(SW). Conversely, at best, the reading of the packet therefrom waits only T(SW). Thereafter, the packet is read from the buffer by spending T(SW) hours. Hence, the duration of the stay of the packet in the node device 604 is 8×T(SW) hours in the worst case, and T(SW) in the best case.

Thus, in the case of performing one-to-one communication, the time taken by a packet to make one round of the network of FIG. 6 is 3×T(SW)+T(SW)=4×T(SW) in the best case. In contrast, the time taken by a packet to make one round of such a network is 3×T(SW)+8×T(SW)=11×T(SW) in the worst case.

Consequently, as is seen from the comparison in transmission delay time between the cases (a) and (b), the transmission delay time obtained in the case (a) is longer than that obtained in the case (b) at all events.

In contrast with this, in the case of the network of the present invention, the relation among the control addresses respectively used in the node devices is controlled, so that the wait time between the input and output of a packet can be reduced.

Further, according to some versions of the present invention, a control packet is employed. Thus, each of the node devices is adapted to use a control address, which is listed in the aforesaid connection table, with a predetermined time difference or lag.

Alternatively, according to other versions of the present invention, a control packet, which is a special packet, is not used. Instead, an ordinary data packet or an idle packet (incidentally, "idle packet" is defined as a packet flowing through a network so as to maintain the synchronization condition of the network when there are no data packets) is used. Thus, each of the node devices is adapted to use a control address, which is listed in the aforesaid connection table, with a predetermined time difference.

For that purpose, a region or field is provided in the header of a packet. This field indicates that this packet is also used for setting the time difference. In the case that ordinary data and idle packets are used for setting the time difference, an operation of rewriting information stored in this field of the packet is performed. Incidentally, a packet having a header, to which time difference setting information is written in this way so as to indicate that an ordinary data or idle packet is used for setting the time difference setting information, is referred to as a "time difference setting packet". Despite this name time difference setting packet is not used only for setting the time difference, but also as a packet for transmitting ordinary data and for maintaining the synchronization condition, by rewriting a part of the header thereof in such a manner as to indicate an ordinary data or idle packet. Therefore, the data portion of the packet and the rest of the header thereof are not changed. Consequently, there is no impediment in performing the functions of ordinarily transmitting data and maintaining the synchronization condition.

Further, a (first) transmission control system, which uses a communication network employing the aforementioned control packet, will now be described, focusing by way of example on the case of the transmission control system using the connection table of FIG. 4, thereby easily controlling the transmission of data or information.

The point of this description is that the control addresses listed in the connection table (for instance, as illustrated in FIG. 4) are used in each of the node devices, which are connected to the network, with a predetermined time difference. Using the control address with a predetermined time difference means that for example, an upstream node device operates by using the control address A3, A4, A5 . . . at the same moment when a given node device operates by using the control address A1, A2, A3 . . . , and that a third node device, farther upstream, operates by using the control address A5, A6, A7 . . . at the same moment when a node device operates by using the control address A1, A2, A3 . . . .

In this transmission control system, the aforesaid control packet having the predetermined header at least at the time of starting the network is made to go rounds of the network. The aforesaid control packet is received and transmitted between the node devices periodically or as needed. According to the present invention, such a control packet is used, and the node devices use the control addresses, which are described in the aforesaid connection table, with the predetermined time differences.

Further, a control packet is generated by a control packet generating portion of each of the aforesaid node devices. The generated control packet is outputted to the predetermined transmission channel (for instance, the transmission channel 1) when the switch performs the predetermined connection according to the aforementioned connection table (for example, when the control address A1 is used).

Incidentally, the solitary node device (hereunder referred to as a master node device) only and voluntarily transmits the control packet in the network when starting the network.

When the node device (hereunder referred to as the slave node device) other than the aforesaid master node device receives the control packet, the received control packet is detected in the aforementioned separation-insertion portion, and a control packet detection signal is transmitted therefrom to the control portion.

When the aforesaid control portion receives the control packet detection signal, an operation is performed by using the control addresses arranged in the predetermined order on the aforesaid connection table after the elapse of a predetermined time period. For example, when receiving the control packet detection signal, the aforesaid control portion reads the control address A1 after the elapse of the predetermined time period. Subsequently, this control portion reads the control addresses A2, A3, . . . , A8, A1, A2, . . . in this order. Thus, the control portion operates according to the read control addresses. Concurrently with this, a control packet is outputted from the control packet generating portion to the predetermined transmission channel (for example, the transmission channel 1) when the switch establishes the predetermined connection according to the connection table (for instance, during the control address A1 is used). Incidentally, only the separation-insertion portion of the master node device does not output a control packet detection signal even when receiving a control packet.

Moreover, at least when the network is started, the generation of a control packet by the master node device is necessary for use of the control address, listed in the connection table, with the predetermined time difference by each of the node devices. However, the master node device may periodically generate control packets and let the control packets flow through the network not only when starting the network but also during an ordinary operation. In this case, such operations of the master node device are redundant in view of the operation of setting the time difference for using the control addresses, unless the already set time difference is changed owing to an occurrence of an unexpected event. However, such operations of the master node device are preferably, from the viewpoint of the maintenance and management of the network, achieved by using the control packet.

Next, a second transmission control system using a communication network, which does not employ the aforementioned control packet, will be described. Similarly, the following description will focus on the case of the second transmission control system using the connection table of FIG. 4, thereby easily controlling the transmission of data or information.

The point of this description is that the control address listed in the connection table (for example, as illustrated in FIG. 4) is used in each of the node devices, which are connected to the network, with a predetermined time difference, similarly as in the case of the description of the first transmission control system.

In this second transmission control system, a time difference setting packet having the predetermined header at least at the time of starting the network is made to go rounds of the network. According to the present invention, it is realized by using a time difference setting packet that each of the node devices uses the control address, which is described in the aforesaid connection table, with the predetermined time differences.

Further, the aforesaid time difference setting packet is generated by rewriting the header of a packet (namely, an ordinary or idle packet) outputted to the predetermined transmission channel (for instance, transmission channel 1) when the aforesaid switch (or switching means) establishes the predetermined connection (for example, during the control address A1 is used) according to the aforesaid connection table for the corresponding node device. Additionally, the device rewrites time difference setting bits provided in the header, which indicate that the corresponding packet is used for setting the time difference.

Incidentally, the solitary node device (referred to as a master node device) only and voluntarily transmits the time difference setting packet in the network when the network is started.

When a node device (referred to as a slave node device) other than the aforesaid master node device receives the time difference setting packet, the received time difference setting packet is detected in the aforementioned separation-insertion portion, and a time difference setting packet detection signal is transmitted therefrom to the control portion.

When the aforesaid control portion receives the time difference setting packet detection signal, an operation is performed by using the control addresses arranged in the predetermined order on the aforesaid connection table after the elapse of a predetermined time period. For example, when receiving the time difference setting packet detection signal, the aforesaid control portion reads the control address A1 after the elapse of the predetermined time period. Subsequently, this control portion reads the control addresses A2, A3, . . . , A8, A1, A2, . . . in this order. Thus, the control portion operates according to the read control addresses. Concurrently with this, the device rewrites the header of a packet outputted to the predetermined transmission channel (for example, transmission channel 1) when the switch establishes the predetermined connection according to the connection table (for instance, during the control address A1 is used). Incidentally, only the separation-insertion portion of the master node device does not output a time difference setting packet detection signal even when receiving a time difference setting packet.

These two transmission control systems enable the use of the same connection table in each of the aforesaid node devices connected to one another in the network with the predetermined time difference.

Now, the preferred embodiments of the present invention will be described in detail by referring to the accompanying drawings.

(First Embodiment)

A first embodiment of the present invention will be described hereinbelow.

In a network according to this embodiment of the present invention, the construction or constitution of the header of a packet and the configuration of the node devices are obtained by changing those in the case of the network according to the reference example so as to solve the problem of increase of transmission delay in performing broadcast communications, in comparison with the transmission delay in the case of performing ordinary communications. Further, at least when the network is started, the transmission of a control packet is performed so that the same connection table is used in each of the node devices with the predetermined time difference.

A control packet is defined as a packet to be received and transmitted between the node devices periodically, or whenever necessary, for the purpose of maintaining and operating the network. The control packet is used for receiving and giving network management information, such as error rate and packet loss probability.

Figure 9:
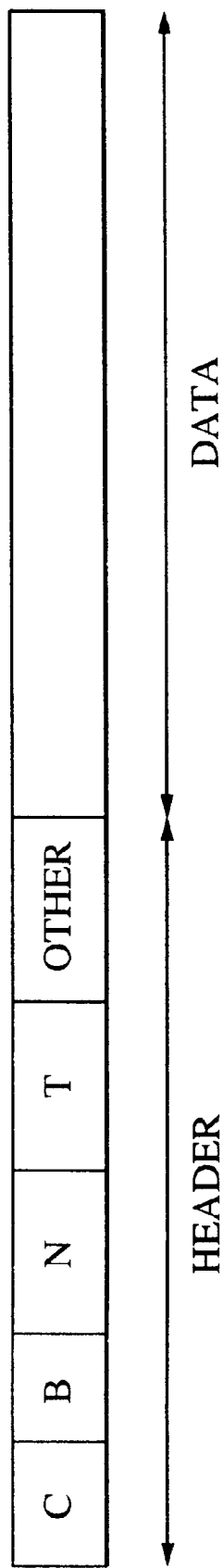
FIG. 9 is a diagram illustrating the format of a packet used in the networks of the first and second embodiments of the present invention.

FIG. 9 is a diagram illustrating the format of a control packet used in the network of this embodiment of the present invention. Reference character C designates a control bit. The control bit is constituted by 1 bit. Further, when a packet including this control bit is a control packet, the control bit C is 1. Conversely, when the packet including this control bit is a packet to be used in an ordinary communication, the control bit C is 0. Reference character B denotes a broadcast bit that is composed of 1 bit. When a broadcast communication is performed, the broadcast bit B is 1; otherwise, the broadcast bit B is 0. Reference character N designates a node number. If 32 node devices are connected in the network, the node number N is represented by using 5 bits by which the node numbers 1 to 32 are indicated. Reference numeral T represents a transmission channel number. If the transmission channel number corresponding to the parallel multiplex transmission path (namely, the multiplexing number (or the multiplicity)) is 8, the transmission channel number T ranging from 1 to 8 is represented by using 3 bits. If necessary, a synchronizing signal and an error-correcting code are inserted into the "OTHER" field. In the case of a control packet, as described above, network management information, such as the error rate or the packet loss probability, is inserted into the data portion.

Figure 1A:
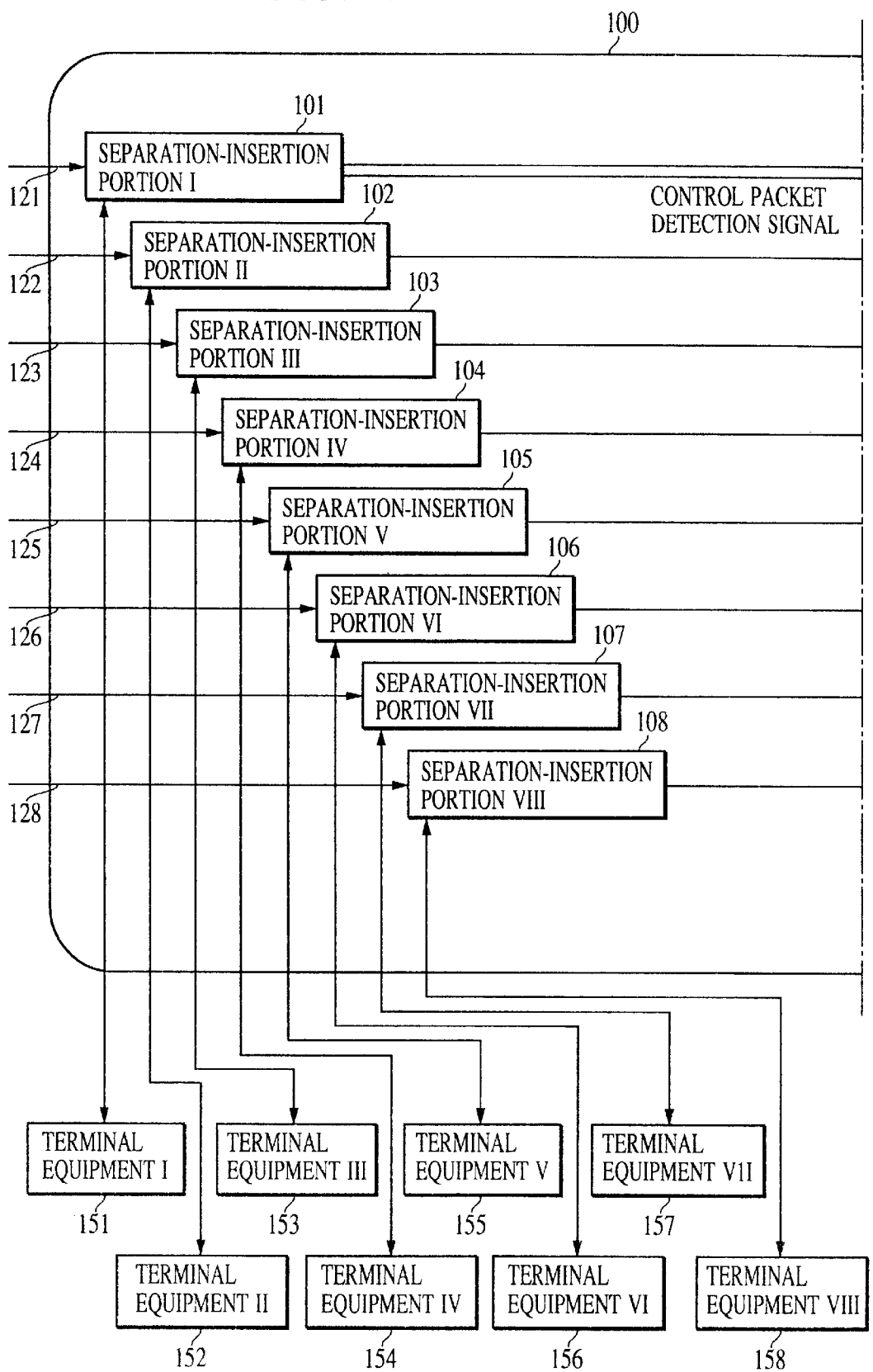
FIG. 1, consisting of FIGS. 1A and 1B, is a diagram illustrating the configuration or arrangement of a node device of a first embodiment of the present invention.

FIG. 1 is a diagram illustrating the configuration of a node device of the network according to this embodiment of the present invention. This figure shows an example in which units of terminal equipment 151 to 158 are connected to a node device 100 through sub-transmission paths.

Reference numerals 121 to 128 and 131 to 138 represent parallel multiplex transmission paths for connecting nodes (or node devices). The transmission paths are constituted by, for example, a plurality of spatially separated optical fiber transmission paths (which may be bundled (namely, what are called "ribbon fibers")) or by wavelength division multiplexing transmission paths that are realized on a single optical fiber by performing wavelength division multiplexing. Further, transmission paths (not shown) for transmitting clock signals may be multiplexed.

Reference numerals 101 to 108 designate respective separation-insertion portions. Each of the separation-insertion portions has a function of detecting addresses written in the headers of the packets, which are inputted from parallel multiplex transmission paths, and separating the inputted packets into packets to be transmitted through the sub-transmission paths to the terminal equipments and packets to be inputted to buffers. Further, each of the separation-insertion portions has another function, of inserting packets transmitted from the units of terminal equipment into a packet flow inputted from the parallel multiplex transmission paths. Moreover, at least one separation-insertion portion (101 in FIG. 1) of the node device 100 is adapted to output a control packet detection signal to a switch control portion when the control packet is inputted thereto from the parallel multiplex transmission path.

Figure 8:
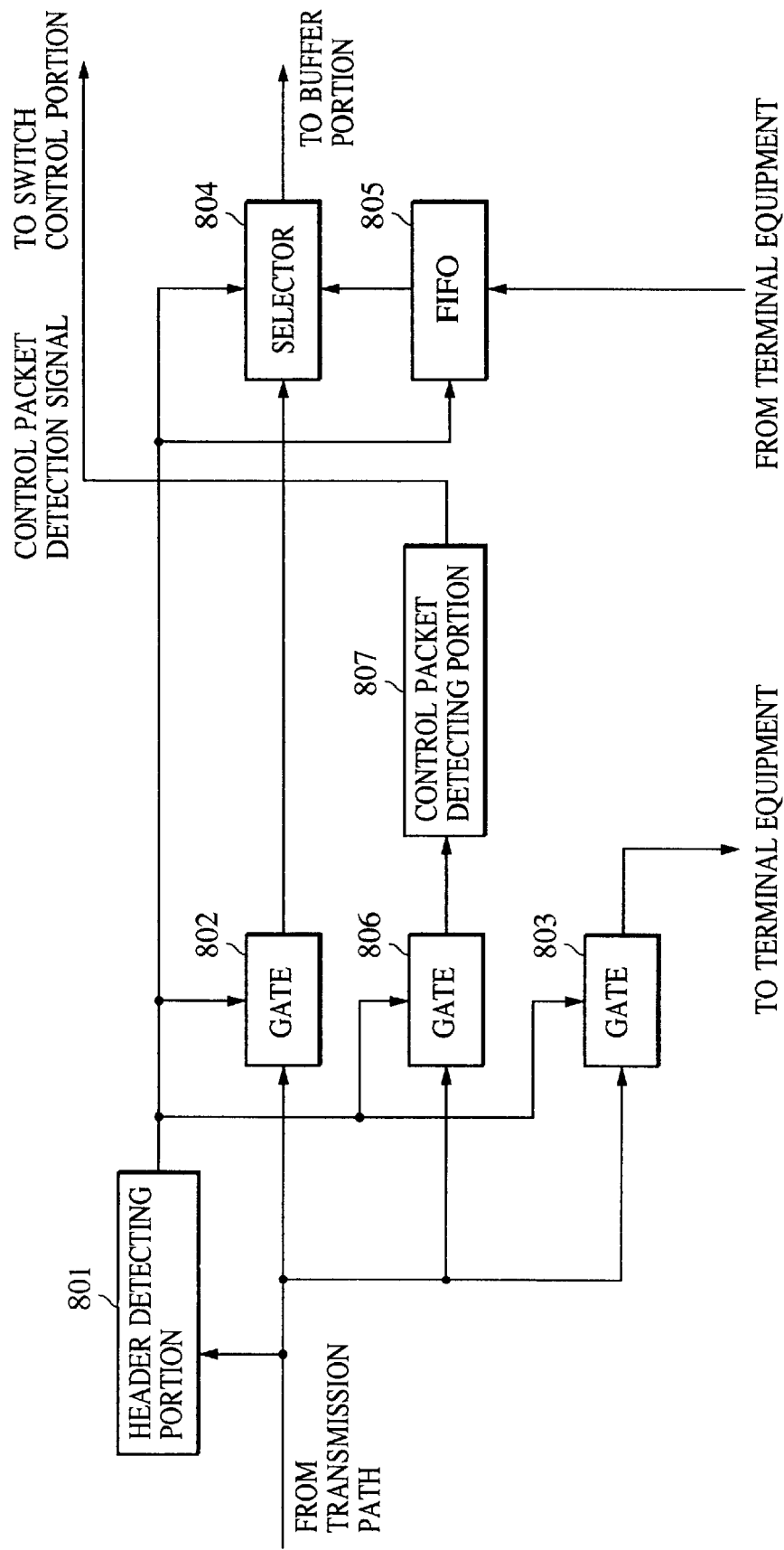
FIG. 8 is a diagram showing the internal constitution of a separation-insertion portion of the node device of this embodiment of the present invention.

FIG. 8 shows the internal constitution of the separation-insertion portion 101. A header (B, C, N) is detected by a header detecting portion 801 from a packet inputted from the parallel multiplex transmission path. Then, the enabling and disabling of gates 802, 803 and 806 are performed according to information included in the header.

In the header detecting portion 801, a number (referred to as the "own-node number") assigned to the own-node device is preliminarily stored. In the event that the control bit is not detected in the header, i.e., if the control bit is 0, the header detecting portion 801 controls the routing of the packet as follows.

4-1. When the detected node number matches the own-node number, the header detecting portion 801 enables the gate 803 and disables the gates 802 and 806, thereby to output the packet only to the terminal equipment.

4-2. When the detected node number does not match the own-node number and the B-bit is 0, the header detecting portion 801 enables the gate 802 and disables the gates 803 and 806, thereby to output the packet only to a selector 804.

4-3. When the detected node number does not match the own-node number and the B-bit is 1, the header detecting portion 801 enables both of the gates 802 and 803 and disables the gate 806, thereby to output the packet to the terminal equipment and the selector 804.

If the control bit is detected in the header, i.e., if the control bit is 1, the header detecting portion 801 controls the routing of the packet as follows.

4-4. The header detecting portion 801 disables both of the gates 802 and 803 and enables the gate 806, thereby to send the packet to a control packet detecting portion 807. The control packet detecting portion 807 outputs a control packet detection signal to the switch control portion.

The internal construction or constitution of the conventional separation-insertion portion shown in FIG. 2 may be employed as that of each of the separation-insertion portions 102 to 108. Similarly to separation-insertion portion 101, the internal construction or constitution of the separation-insertion portion shown in FIG. 8 may be employed as that of each of the separation-insertion portions 102 to 108. When the constitution illustrated in FIG. 8 is employed, there is no need for outputting a control packet detection signal to the switch control portion.

Reference numerals 111 to 118 denote respective buffers. Each of these buffers has a function of temporarily storing packets, which are outputted from the separation-insertion portions, in memory regions respectively corresponding to output terminals of a switch 141 or in FIFO memory connected to a given output terminal of the switch 141.

FIG. 3 shows the internal construction or constitution of each of the buffers 111 to 118. The constitution and operation of each of the buffers 111 to 118 are the same as those of each of the buffers of the reference example. The description of the buffers will be made again below, however, in spite of the partial repetition. Reference numeral 301 designates a buffer memory consisting of memory regions 311–318 and FIFO memory 304, which respectively correspond to the output terminals of each channel. Reference numeral 302 denotes a header detecting portion for detecting the B-bit, N-bit and T-bit from the header of a packet. Reference numeral 303 represents an address counter for supplying a writing address to the buffer memory 301. The memory regions of the buffer memory 301 have respective input terminals which are independent of one another so that data can be written to the plural memory regions simultaneously. In each of the buffers 111 to 118, a header is detected by the header detecting portion 302 from a packet inputted from the separation-insertion portion. Then, the memory region to be used to store the packet is determined according to information included in the header.

The header detecting portion 302 preliminarily stores a node number (referred to as a "downstream node number") of an adjoining downstream node (device), and the transmission channel number of a parallel multiplex transmission path to be connected to each of the buffers through the separation-insertion portion.

The header detecting portion 302 controls the routing of the packet as follows.

5-1. When the detected node number matches the downstream node number and the B-bit is 0, the header detecting portion 302 designates or specifies the memory region having the same number as the detected transmission channel number (namely, one of the memory regions 311 to 318). Further, the header detecting portion 302 causes the address counter 303 to generate a writing address. The header detecting portion 302 then causes the buffer memory 301 to store the packet at the generated writing address.

5-2. When the detected node number does not match the downstream node number and the B-bit is 0, the header detecting portion 302 causes the FIFO 304 to store the packet.

5-3. When the detected node number matches the downstream node number and the B-bit is 1, the header detecting portion 302 causes the address counter 303 to generate a writing address. The header detecting portion 302 then causes all of the memory regions 311 to 318 to store the packet at the generated writing address simultaneously.

5-4. When the detected node number does not match the downstream node number and the B-bit is 1, the header detecting portion 302 causes the address counter 303 to generate a writing address. The header detecting portion 302 then causes the memory region having the same number as the detected transmission channel number (namely, one of the memory regions 311 to 318) to store the packet at the generated writing address.

Reference numeral 141 designates a switch. The configuration and operation of this switch are the same as those of the switch of the reference example. The description of this switch will be made again below, however, in spite of the partial repetition. The switch 141 is operative to connect packets, each of which is inputted to one of input terminals IN1 to IN8, to a given one of output terminals OUT1 to OUT8 under the control of a switch control portion 142. When the plurality of optical fiber transmission paths are used as the parallel multiplex transmission paths, the switch 141 performs switching by using a space switch or the like.

Reference numeral 142 designates a switch control portion that controls the switch in accordance with, for example, the connection table of FIG. 4. Control addresses A1, A2, A3, A4, A5, A6, A7 and A8 are periodically and sequentially changed by the switch 141. Thus, the switch 141 first connects a signal, which is inputted to the input terminal IN1 thereof, to the output terminal OUT1. In the next period or cycle, the switch 141 connects this signal to the output terminal OUT2. Likewise, the switch 141 connects this signal to the output terminals OUT3, OUT4, OUT5, OUT6, OUT7 and OUT8 in succession. Similarly, a signal inputted to the input terminal IN2 is repeatedly connected to the output terminals OUT2, OUT3, OUT4, OUT5, OUT6, OUT7, OUT8 and OUT1 in this order. This is the same with signals inputted to the terminals IN3 to IN8. A connection time, that is, a period of time during which, for example, the input terminal IN1 is connected to the output terminal OUT1 (similarly, the input terminals IN2, . . . , IN8 are connected to the output terminals OUT2, . . . , OUT8, respectively) should be set at an integral multiple of packet length. For simplicity of description, it is assumed herein that each of the connection times T1, T2, T3, T4, T5, T6, T7 and T8 respectively corresponding to the input terminals IN1, IN2, . . . IN8 is set to be 1 packet length (=T(SW)).

Additionally, the switch control portion 142 controls the connections between the input terminals IN1 to IN8 and the output terminals OUT1 to OUT8 so that packets inputted to the switch 141 are not concurrently outputted to a same transmission channel.

FIG. 12 chronologically illustrates an operation performed by the switch 141 according to the connection table of FIG. 4. Thus, the operation of the switch 141 consists of steps to be performed in eight consecutive operation periods T1, T2, T3, T4, T5, T6, T7 and T8, respectively. Further, each of these eight operating periods is divided into a reading period Td, during which packets are read from the memory regions 311 to 318, and a reading period Tf, during which a packet is read from FIFO memory 304, according to actions performed in the buffers 111 to 118. Incidentally, as described above, for simplicity of description, it is assumed in this embodiment that T1=T2=T3=T4=T5=T6= T7=T8=a time required for reading 1 packet (=T(SW)) and that a packet is read from FIFO when no packets to be read are stored in the memory regions 311 to 318.

Reference numeral 143 denotes a buffer control portion that is operative to control the buffers so that a packet stored in each of the buffers is read therefrom when one of the input terminals of the switch, which is connected to a given one of the buffers, is connected to a predetermined one of the output terminals thereof.

Moreover, when receiving the control packet detection signal, the switch control portion 142 performs an operation by using the control addresses arranged in the predetermined order on the connection table of FIG. 4 after the elapse of a preset and predetermined time period. For example, in this embodiment, when receiving a control packet detection signal, the switch control portion reads the control address A1 after the elapse of the preset and predetermined time period. Subsequently, this switch control portion reads the control addresses A2, A3, . . . , A8, A1, A2, . . . in this order. Thus, the control portion operates according to the read control addresses. Further, concurrently with this, the switch control portion 142 issues an instruction or command to the buffer control portion 143 so that a control packet is outputted to the predetermined transmission channel (for example, the transmission channel 1), when the switch 141 establishes the predetermined connection according to the connection table (for instance, during the control address A1 is used and the terminals IN1 and OUT1 are connected, in this embodiment). The buffer control portion outputs a control signal to a control packet generating portion 150 and a selector 151 so that a control packet is outputted from the control packet generating portion 150 to the transmission channel 131.

The configuration of the network according to this embodiment will be described hereinbelow by referring to FIG. 6. Each of node devices 601 to 604 has the configuration indicated by reference numeral 100 in FIG. 1. The node devices connected in the network according to this embodiment are classified into two kinds of devices, namely, a master node device and slave node devices.

The master node device is operative to voluntarily output a control packet when the network is started. The switch control portion operates so that a control packet is outputted from the control packet generating portion 150 to the transmission channel 131 when the switch 141 uses the control address A1 and moreover, the terminals IN1 and OUT1 are connected to each other. Further, only the master node device does not output a control packet detection signal even when receiving a control packet. Thus, the switch control portion of the master node device does not operate in accordance with a control packet detection signal. Moreover, the network is controlled in a centralized manner by providing only one master node device in the network. In this embodiment, the node device 101 is employed as a master node device.

The slave node devices are node devices other than the master node device. A slave node device placed just downstream of the master node device receives a control packet generated by the master node device. This slave node device sends the control packet to another slave node device, which is located more downstream than the former node slave, by performing the aforementioned operation. In this embodiment, node devices 602, 603 and 604 are employed as slave node devices.

In the aforementioned network, a control packet is transmitted at the time of starting the network so that the use of the same connection table with the predetermined time difference is performed by each of the node devices. This solves the problem of increased transmission delay in broadcast communications, in comparison with the transmission delay in the case of ordinary communications.

Next, the operation procedure at the time of starting this network will be described. First, when the power to each of the node devices is turned on, the synchronization among the node devices is established, with the result that each of the node devices come to be able to recognize the leading part of a packet when receiving the packet. Thus, each of the node devices can detect the header of each packet. The switch control portion 142 periodically changes the connection condition of the switch by performing the sequential and periodical alteration of the control address among the addresses A1 to A8 listed in the connection table of FIG. 4. Incidentally, the time difference among the times at which the connection table is used by the node devices, respectively, depends on the power-on timing and is thus indefinite.

Under such a condition, the operation procedure is performed as follows.

6-1. In the master node device 601, the switch control portion 142 and the buffer control portion 143 operate so that a control packet is outputted from the control packet generating portion 150 to the transmission channel 131 when the switch 141 uses the control address A1 and the terminals IN1 and OUT1 are connected to each other. The buffer control portion 143 outputs a control signal to the control packet generating portion 150 and the selector 151 so that a control packet is outputted from the control packet generating portion 150 to the transmission channel 131.

6-2. The control packet outputted to the transmission channel 131 enters the separation-insertion portion 101 from the transmission channel 121 of the slave node device 602. The header detecting portion 801 detects that the content of the control bit is 1. Then, both of the gates 802 and 803 are disabled. Moreover, the gate 806 is enabled. Thus, the packet is transmitted to the control packet detecting portion 807. Subsequently, the control packet detecting portion 807 outputs a control packet detection signal to the switch control portion 142.

6-3. When receiving the control packet detection signal, the switch control portion 142 of the slave node device 602 performs an operation by using the control addresses arranged in the predetermined order on the connection table of FIG. 4 after the elapse of a preset and predetermined time period. When receiving a control packet detection signal, the switch control portion 142 reads the control address A1 after the elapse of the preset and predetermined time period. Subsequently, this switch control portion 142 reads the control addresses A2, A3, . . . , A8, A1, A2, . . . in this order. Thus, the switch control portion 142 operates according to the read control addresses. In this embodiment, in view of the time between the outputting of a packet from the node device 601 and the inputting of the packet to the node device 602 and the processing time required by the node device 602, the time period during which the adjoining upstream node device (the node device 601) uses the control address A7 and the own-node device (the node device 602) uses the control address A1 at the same time, is employed as the predetermined time period.

6-4. Further, concurrently with the step 6-3, the switch control portion 142 issues an instruction to the buffer control portion 143 so that a control packet is outputted from the control packet generating portion 150 to the transmission channel 131 when the switch 141 uses the control address A1 and the terminals IN1 and OUT1 are connected to each other. The buffer control portion 143 outputs a control signal to the control packet generating portion 150 and the selector 151 so that a control packet is outputted from the control packet generating portion 150 to the transmission channel 131.

6-5. The aforementioned operations at steps 6-2, 6-3 and 6-4 are performed in the slave node device 603.

6-6. The aforementioned operations at steps 6-2, 6-3 and 6-4 are performed in the slave node device 604.

6-7. The control packet outputted to the transmission channel 131 enters the separation-insertion portion 101 from the transmission channel 121 of the master node device 601. The header detecting portion 801 detects that the content of the control bit is 1. Then, both of the gates 802 and 803 are disabled. Moreover, the gate 806 is enabled. Thus, the packet is transmitted to the control packet detecting portion 807. However, only the master node device does not cause the control packet detecting portion 807 to output a control packet detection signal to the switch control portion 142. Thus, the switch control portion 142 of the master node device does not operate in accordance with a control packet detection signal.

The use of the connection table in each node device with the predetermined time difference is realized by circulating a control packet through the network. Note that a control packet is transmitted from the adjacent upstream node device during the upstream node device uses the control address A1 on the connection table. Thus, the use of the connection table in each node device with the predetermined time difference is achieved by making the own-node device use the control address A1 on the connection table after the elapse of a predetermined time period since the reception of the control packet. Generally, the time difference in the time of using the control address on the connection table as between the master node device and the upstream slave node device, is different from the time difference in the time of using the control address on the connection table as between the other adjoining node devices (incidentally, in the foregoing case, the time difference in the time of using the control address on the connection table between the adjoining node devices has the same value for all of pairs of adjacent node devices).

As a result of following this procedure, a downstream node device 602 operates using the control address A7, A8, A1 . . . at the same moment when a node device (for example, the node device 601) operates using the control address A1, A2, A3 . . . . Similarly, a more downstream node device 603 operates using the control address A5, A6, A7 . . . at the same moment when the node device 601 operates by using the control address A1, A2, A3 . . . . Likewise, a far more downstream node device 604 operates using the control address A3, A4, A5 . . . at the same moment when the node device 601 operates by using the control address A1, A2, A3 . . . .

Incidentally, at least when starting the network, it is necessary for using the control addresses, which are listed in the connection table, with the predetermined time difference by each of the node devices that the master node device generates a control packet. However, the master node device may periodically generate control packets and let the control packets flow through the network, not only when starting the network but also during ordinary operation. In this case, such operations of the master node device are redundant in view of the operation of setting the time difference for using the control addresses, unless the already-set time difference is changed owing to an occurrence of an unexpected event. However, such operations of the master node device are preferable, from the viewpoint of the maintenance and management of the network to be achieved by using the control packet.

Next, the broadcast communication will be described hereunder by referring to FIGS. 1 and 6. In the following description, it is assumed that the parallel multiplex transmission paths are a plurality of spatially separated optical fiber transmission paths and that the switches are space switches. However, even in the case of using wavelength division multiplexing transmission paths, a similar operation is performed according to the aforementioned principle. An operation of performing a broadcast communication between the terminal equipment 611 and the other pieces of terminal equipment of the entire network will be described hereinbelow by way of example.

7-1. First, in the terminal equipment 611, the own-node number and the transmission channel number (for instance, N=1, T=1) are written to the header of a packet. Further, in this header, the B-bit is set to 1. Thereafter, the packet is transmitted from this terminal equipment. The packet is then inputted to the separation-insertion portion 101 of the node device 601 through the sub-transmission path.

7-2. In the selector 804 of the separation-insertion portion 101, the packet transmitted from the terminal equipment 611 is inserted into a vacant portion in a packet flow transmitted from the transmission path. Then, the packet flow is transmitted to the buffer 111.

7-3. When the header detecting portion 302 of the buffer 111 detects the header of the inputted packet, the detecting portion 302 designates all of the memory regions 311 to 318 because the B-bit is 1 and the detected node number matches the own-node number (N=1) stored therein. The writing address counter 303 receives information indicating such designation and generates a writing address. Subsequently, the packet is written to all of the memory regions 311 to 318 simultaneously.

7-4. The switch control portion 142 controls the connection relation between the input and output terminals of the switch 141 according to the table of FIG. 4 so that the control addresses A1 to A8 circulate or cycle at a constant period. Further, the switch control portion 142 transmits the control addresses to the buffer control portion 143. When the address A1 is supplied to the buffer control portion 143, this control portion 143 controls the buffer 111 so that a broadcast packet is read from the memory region 311 thereof. When the address A2 is supplied thereto, the buffer control portion 143 controls the buffer 111 so that a broadcast packet is read from the memory region 312 thereof. Similarly, when each of the addresses A3 to A8 is supplied thereto, the buffer control portion 143 controls the buffer 111 so that a broadcast packet is read from a corresponding one of the memory regions 313 to 318 thereof. Thus, the broadcast packets sequentially read from the buffer 111 are inputted to the switch 141 from the input terminal IN1 and are then outputted from all of the output terminals OUT1 to OUT8 to the transmission paths 131 to 138 in sequence.

7-5. The eight packets outputted from the node device 601 are inputted to the separation-insertion portions 101 to 108 of the node device 602 through the parallel multiplex transmission paths. Then, the headers of the packets are detected in the header detecting portion 202. The detected node number (N=1) does not match the stored own-node number (N=2). Further, the B-bit is 1. In addition, the detected C-bit is 0. Under these three conditions, both of the gates 802 and 803 are enabled, and the gate 806 is disabled, so that the packets are outputted to the terminal equipments and the selector 804.

7-6. The packets outputted from the separation-insertion portions 101 to 108 are transmitted to the terminal equipment units 621 to 628. On the other hand, the packet outputted to the selector 804 is inputted to each of the buffers 111 to 118 therethrough.

7-7. When the header detecting portion 302 detects the header, the packet is stored in the memory region having the same number as the stored transmission channel number because the B-bit is 1 and the detected node number (N=1) does not match the own-node number (N=2). Namely, in the buffer 111, the packet is stored in the memory region 311. Further, in the buffer 112, the packet is stored in the memory region 312. Similarly, in the buffers 113 to 118, the packets are stored in the memory regions 313 to 318, respectively.

7-8. The packet stored in each of the buffers is read only in the case of the control address A1. Further, the broadcast packet inputted from the transmission path 121 is outputted to the transmission path 131. Moreover, the broadcast packet inputted from the transmission path 122 is outputted to the transmission path 132. Likewise, the broadcast packets inputted from the transmission paths 123 to 128 are outputted to the transmission paths 133 to 138, respectively.

7-9. Similarly, signals are distributed by the node devices 603 and 604 to the group of the terminal equipments 631 to 638 and the group of the terminal equipments 641 to 648. Moreover, the signals are passed or relayed and inputted to the node device 601.

7-10. When detecting the header of the packet, each of the separation-insertion portions of the node device 601 enables the gate 803 and disables the gates 802 and 806 because the detected node number matches the stored node number. In addition, the detected C-bit is 0. Under these conditions, the separation-insertion portions outputs the packets only to the terminal equipment units.

7-11. The packets outputted from each of the separation-insertion portions 101 to 108 to the terminal equipment are transmitted to the terminal equipment units 611 to 618 through the sub-transmission paths. Thus, the packets are transmitted to all of the terminal equipment on the network.

Thus, when performing a broadcast communication, eight copies of a broadcast packet are obtained in the transmitting node device connected to the transmitting terminal equipment that transmits the broadcast packet, and are then transmitted to the eight rings. Moreover, each of the copied broadcast packets is transmitted on the corresponding ring in such a manner as not to migrate to another ring. Finally, the transmission of the copied broadcast packet is terminated at the transmitting node device.

In the following description, it will be described that as compared with the transmission delay caused in the reference example, the transmission delay caused in the case of broadcast communication is reduced if performed according to this aspect of the present invention. The transmission delay time in the case of the broadcast communication in this embodiment is first obtained on the same condition as in the case of the reference example, as follows.

First, the transmission delay time in the case of the case (a) (utilizing the broadcast communication) described in the foregoing description of the reference example is obtained as follows. The differences between the networks according to the reference example and this embodiment are clarified by the following description.

In the network according to the reference example, each of the switch control portions of the node devices 602, 603 and 604 operates using the control address A1, A2, A3, . . . at the same moment when the switch control portion of the node device 601 operates using the control address A1, A2, A3, . . . .

In contrast, in the network according to this embodiment of the present invention, at the same moment when the switch control portion of the node device 601 operates using the control address A1, A2, A3, . . . , the downstream node device 602 operates using the control address A7, A8, A1 . . . , and the more downstream node device 603 operates using the control address A5, A6, A7 . . . , and the far more downstream node device 604 operates using the control address A3, A4, A5 . . . .

A packet outputted from the terminal equipment 611 reaches the buffer 111 via the separation-insertion portion 101 of the node device 601. The packet is concurrently written to all of the memory regions 311 to 318. Thus, no matter what control address is used by the switch 141, the packet can be read from any of the memory regions. Every change of the control address, the packet is read from the memory regions. Further, because the network is assumed to be in the idle state, the packet is read by the switch 141 just after this packet is written to the buffer 111. For instance, if a first packet is outputted from the terminal OUT1 of the switch 141 to the transmission path 131 when the current control address is A1, a packet is outputted from the terminal OUT2 of the switch 141 to the transmission path 132 when the current control address is the next control address A2. Packets are similarly outputted each time when the current control address changes from A3 to A7. Thus, a final packet is outputted from the terminal OUT8 of the switch 141 to the transmission path OUT8 when the current control address is A8. Therefore, the duration of the stay of a packet in the node device 601 is T(SW) in the case of the packet outputted therefrom at the earliest time. Further, the duration of the stay of a packet therein is 8×T(SW) in the case of the packet last outputted therefrom. The herein-above described process performed in this embodiment is the same as the aforementioned process performed in the reference example.

Consider about the packet inputted from the transmission channel 121 in the node device 602 (namely, the packet first outputted from the node device 601). When the packet, which has been outputted from the terminal OUT1 of the switch 141 of the node device 601 during the control address is A1, has reached the buffer 111 of the node device 602, the control address used in the node device 602 is changed to A8 (incidentally, the control address used in the node device 601 is A2).

As described above, in the case of performing broadcast communications, the packet can be read only when the control address is A1, in the node devices other than the node devices connected to the terminal equipment which transmits the packet, namely, in the node devices 602, 603 and 604 in this embodiment. Therefore, the reading of the packet should wait until the next time the control address becomes A1 (namely, wait T(SW)). Then, the packet is read by spending T(SW). Therefore, the duration of the stay of a packet in one node device is 2×T(SW).

Even in the other node devices, a packet is read only when the control address is A1. Thus, the packet is outputted therefrom concurrently with the packet inputted from the transmission channel 121 or when the control address A1 has recurred again after completion of one cycle of the periodic change of the control address A1, A2, A3 and so on.

Subsequently, when the packet, which has been outputted from the terminal OUT1 of the switch 141 of the node device 602 during the control address is A1, reaches the buffer 111 of the node device 603, the control address used in this node device becomes A8. As described above, in the case of performing broadcast communications, the packet can be read only when the control address is A1. Therefore, the reading of the packet should wait until the next time the control address becomes A1 (namely, wait T(SW)). Then, the packet is read by spending T(SW). Consequently, the duration of the stay of a packet in one node device is 2×T(SW). This is the same with the case of the node device 604.

That is, in the case of performing broadcast communication, the time taken by a packet to make one round of the network of FIG. 6 is T(SW)+3×2×T(SW)=7T(SW), using the fastest channel. In contrast, when using the slowest transmission channel, the time taken by a packet to make one round of such a network is 15×T(SW) obtained by adding the time taken by the control address to circulate one time, to 7×T(SW).

On the other hand, consider the transmission delay time in the aforementioned case (b) (utilizing a one-to-one communication) of the reference example. However, in the case of performing a one-to-one communication, the transmission delay time due to the using of the connection table in each of the node devices with the predetermined time difference is not affected.

Similarly as in the case of the reference example, when one-to-one communication is performed, the time taken by a packet to make one round of the network of FIG. 6 is 3×T(SW)+T(SW)=4×T(SW) in the best case. In contrast, the time taken by a packet to make one round of such a network is 3×T(SW)+8×T(SW)=11×T(SW) in the worst case.

Therefore, as is seen from the comparison between the transmission delay times in the cases (a) and (b) in the network according to this embodiment, the transmission delay time in the case of performing broadcast communication is not always larger than that in the case of performing one-to-one communication. Moreover, as is seen from the comparison between the transmission delay times in the case of this embodiment and the reference example, this embodiment of the present invention improves the transmission delay.

(Second Embodiment)

Hereinafter, a second embodiment of the present invention will be described.

Figure 10A:
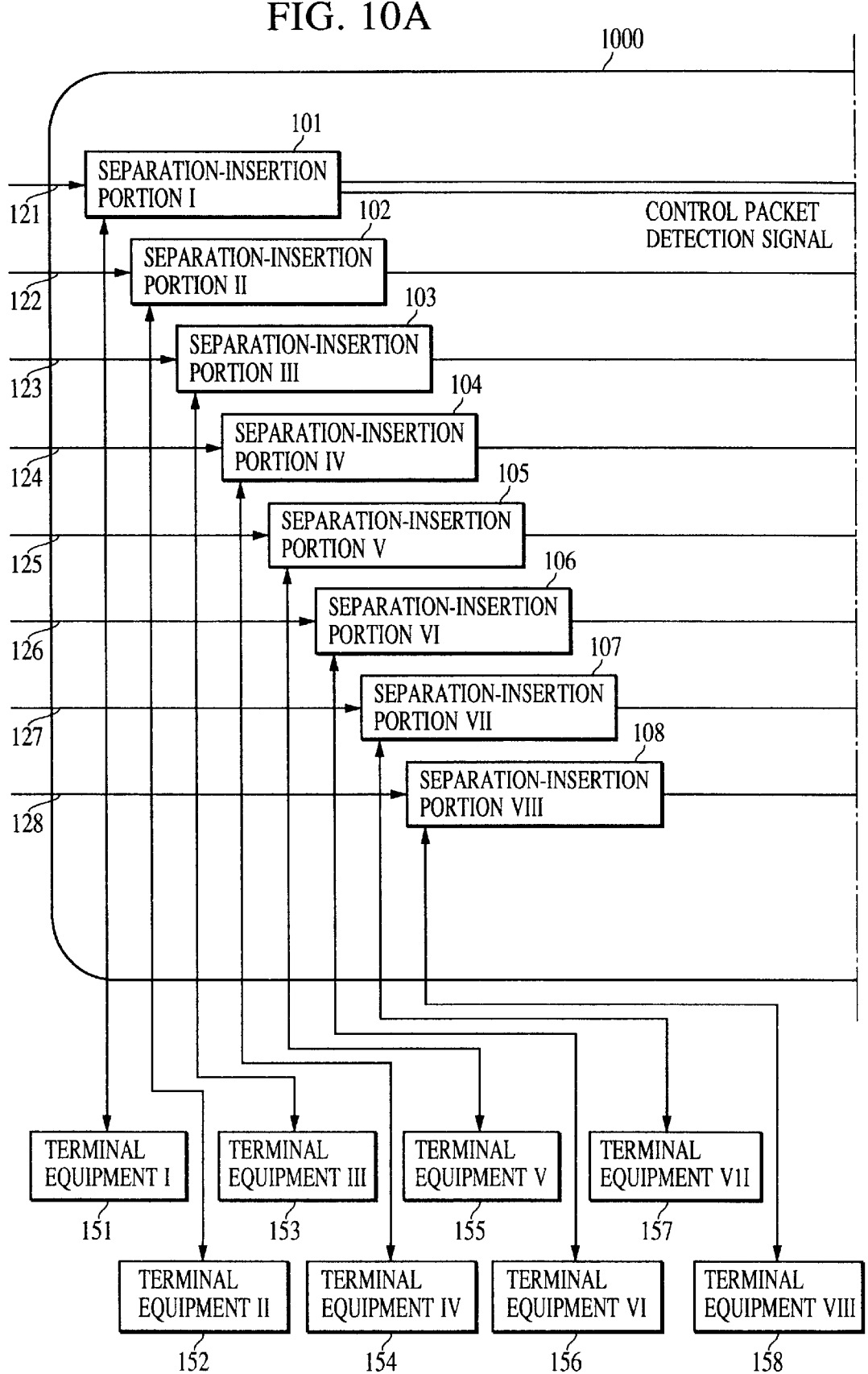
FIG. 10, consisting of FIGS. 10A and 10B, is a diagram showing the configuration of a node device of the second embodiment of the present invention.

FIG. 10 is a diagram showing the configuration of a node device according to the second embodiment of the present invention. The difference in configuration of the node device between this embodiment and the first embodiment shown in FIG. 1 is that a control packet outputted from the control packet generating portion 150 is inserted into the packet flow at the input side of the switch 141 according to the first embodiment, while such a control packet is inserted thereinto at the output side of the switch 141 according to the second embodiment. Thus, in FIGS. 1 and 10, like reference numeral designate like constituent elements of the node device, and the description of such elements is omitted herein.

The operation procedure at the time of starting the network according to the second embodiment is the same as the operation procedure according to the first embodiment. Therefore, the time difference, with which the control address on the connection table is used in each of the node devices, is set by following such procedure.

Consequently, even the node device of the configuration shown in FIG. 10 solves the problem of increasing transmission delay in performing broadcast communications, in comparison with ordinary communications.

(Third Embodiment)

Now, a third embodiment of the present invention will be described.

The third embodiment differs from the first and second embodiments in the following respects. In the case of the first and second embodiments, the use of the control address listed in the connection table in each of the node devices with the predetermined time difference is achieved by using a control packet. However, in the case of the third embodiment, a special packet such as a control packet is not used. Rather, the function of such control address in the node devices with the predetermined time difference is achieved by an ordinary data or idle packet.

Thus, in the third embodiment, a region or field is provided in the header of a packet. This field indicating that this packet is also used for setting the time difference. In the case that ordinary data and idle packets are used for setting the time difference, an operation of rewriting information stored in this field of the packet is performed. Incidentally, a packet having a header, to which time difference setting information (herein referred to as a "time difference setting bit") is written so as to indicate that an ordinary data or idle packet is used for setting the time difference setting information, is referred to as a "time difference setting packet". A time difference setting packet is not only used for setting the time difference, regardless of such a name, but is also used as a packet for transmitting ordinary data and for maintaining the synchronization condition, by rewriting a part of the header thereof in such a manner as to indicate an ordinary data or idle packet. Therefore, the data portion of the packet and the rest of the header thereof are not changed.

Consequently, there is no impediment in performing the functions of ordinarily transmitting data and maintaining the synchronization condition.

Figure 14:
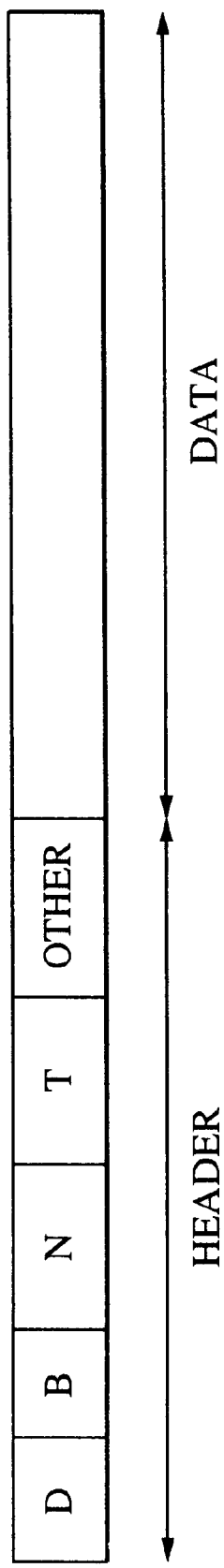
FIG. 14 is a diagram illustrating the format of a packet used in the networks of the third and fourth embodiments of the present invention.

FIG. 14 is a diagram illustrating the format of a packet used in the networks of the third embodiment of the present invention. Reference character D designates a time difference setting bit constituted by 1 bit. When the ordinary communication packet is used as a time difference setting packet, the time difference setting bit is 1. In contrast, when the packet is used only for an ordinary communication, the time difference setting bit is 0. Reference characters B, N and T are the same as in the first embodiment.

Seemingly, the header shown in FIG. 14 is similar to that shown in FIG. 9. However, these headers differ from each other in that network management information such as error rate or packet loss probability is written to the data portion in the control packet of FIG. 9, while ordinary data is written to the data portion in the packet of FIG. 14.

Figure 13A:
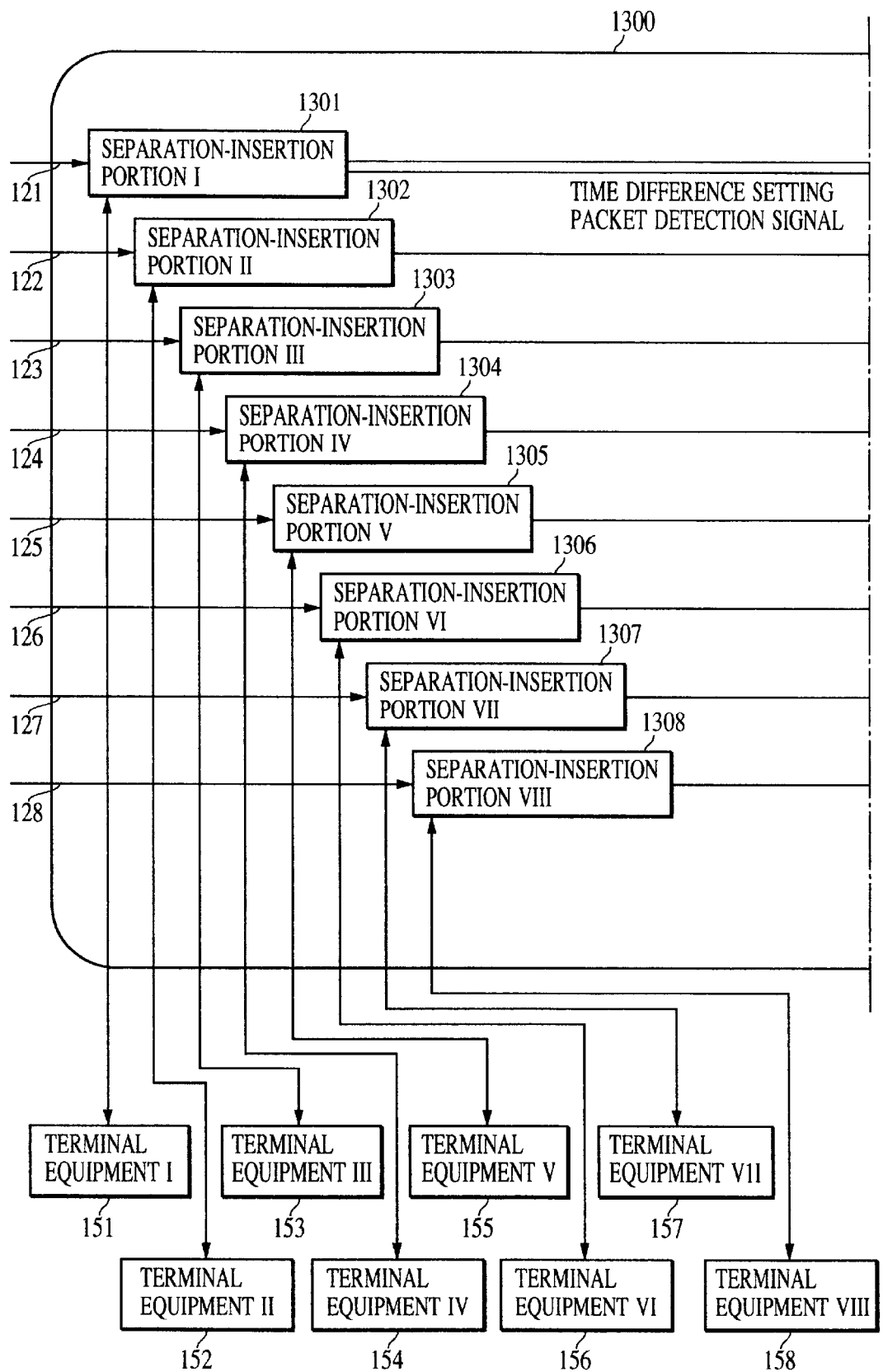
FIG. 13, consisting of FIGS. 13A and 13B, is a diagram showing the configuration of a node device of a third embodiment of the present invention.

FIG. 13 is a diagram showing the configuration of a node device of the third embodiment of the present invention, and shows an example wherein the terminal equipment units 151 to 158 are connected to a node device 1300 through sub-transmission paths. Further, transmission paths (not shown) for transmitting clock signals may be multiplexed.

Reference numerals 1301 to 1308 denote respective separation-insertion portions. Each of the separation-insertion portions has a function of detecting addresses from packets, which are inputted from parallel multiplex transmission paths, and separating the inputted packets into packets to be transmitted through the sub-transmission paths to the terminal equipments and packets to be inputted to buffers. Further, each of the separation-insertion portions has another function, of inserting packets transmitted from the terminal equipments into a packet flow inputted from the parallel multiplex transmission paths. Moreover, at least one of the separation-insertion portion (1301 in FIG. 13) of the node device 1300 is adapted to output a time difference setting packet detection signal to a switch control portion when the time difference setting packet is inputted thereto from the parallel multiplex transmission path.

Figure 15:
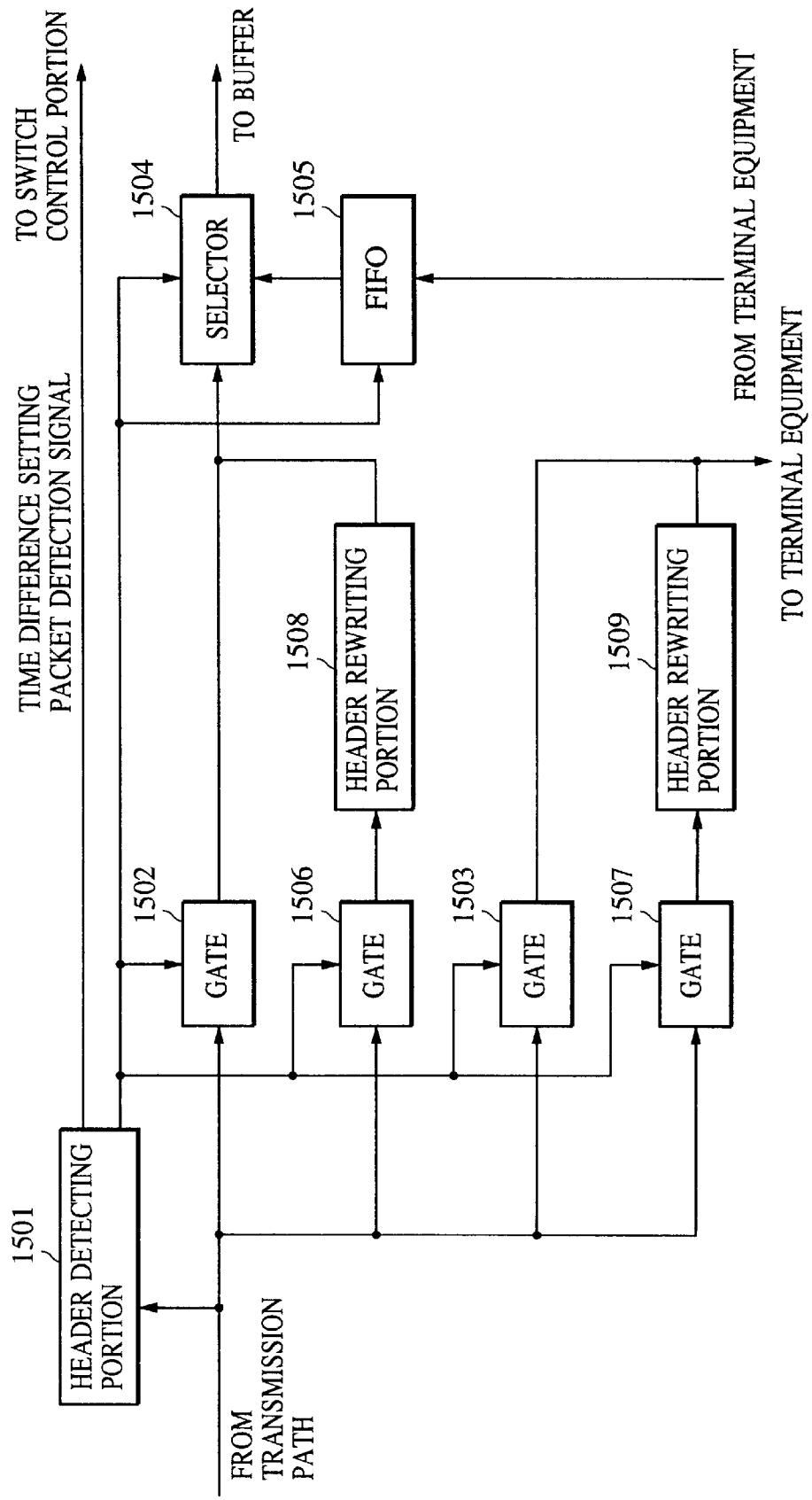
FIG. 15 is a diagram showing the internal construction or constitution of a separation-insertion portion of the node device of the embodiment of the present invention.

FIG. 15 shows the internal constitution of the separation-insertion portion 1301. A header (B, D, N) is detected by a header detecting portion 1501 from a packet inputted from the parallel multiplex transmission path. Then, the enabling and disabling of gates 1502, 1503, 1506 and 1507 are performed according to information included in the header. Further, in header rewriting portions 1508 and 1509, the header is rewritten in such a manner as to invalidate the time difference setting bit, i.e., to create the condition D=0. This header rewriting operation is performed so as to prevent the time difference setting packet from flowing through the network in an unexpected state. Thus, the gate 1507 and the header rewriting portion 1509 may be omitted. In the case where the gate 1507 and the header rewriting portion 1509 are not used, the gate 1503 is enabled instead of enabling the gate 1507.

In the header detecting portion 1501, a number (referred to as an "own-node number") assigned to the own-node device is preliminarily stored.

The header detecting portion 1501 controls the routing of the packet as follows.

8-1. On conditions that the detected node number matches the stored own-node number and that the time difference setting bit D is 1, the header detecting portion 1501 enables the gate 1507 and disables the gates 1502, 1503 and 1506, thereby to output the packet only to the header rewriting portion 1509. This header rewriting portion 1509 performs the rewriting of the header in such a way as to invalidate the time difference setting bit, i.e., to create the condition D=0. Then, the portion 1509 outputs the packet to the terminal equipment. The header detecting portion concurrently outputs a time difference setting packet detection signal to a switch control portion 1342.

8-2. On conditions that the detected node number matches the own-node number and that the time difference setting bit D is 0, the header detecting portion 1501 enables the gate 1503 and disables the gates 1502, 1506 and 1507, thereby to output the packet only to the terminal equipment.

8-3. On conditions that the detected node number does not match the own-node number, that the B-bit is 0 and that the time difference setting bit D is 1, the header detecting portion 1501 enables the gate 1506 and disables the gates 1502, 1503 and 1507, thereby to output the packet only to the header rewriting portion 1508. This header rewriting portion 1508 performs the rewriting of the header in such a way as to invalidate the time difference setting bit, i.e., to create the condition D=0. Then, the portion 1508 outputs the packet only to the selector 1504. The header detecting portion concurrently outputs a time difference setting packet detection signal to a switch control portion 1342.

8-4. On conditions that the detected node number does not match the own-node number, that the B-bit is 0 and that the time difference setting bit D is 0, the header detecting portion 1501 enables the gate 1502 and disables the gates 1503, 1506 and 1507, thereby to send the packet only to the selector 1504.

8-5. On conditions that the detected node number does not match the own-node number, that the B-bit is 1 and that the time difference setting bit D is 1, the header detecting portion 1501 enables both of the gates 1506 and 1507 and disables the gates 1502 and 1503, thereby to output the packet to the header rewriting portions 1508 and 1509. The header rewriting portions 1508 and 1509 perform the rewriting of the header in such a way as to invalidate the time difference setting bit, i.e., to create the condition D=0. Then, the portions 1508 and 1509 output the packet to the terminal equipment and the selector 1504. The header detecting portion concurrently outputs a time difference setting packet detection signal to the switch control portion 1342.

8-6. On conditions that the detected node number does not match the own-node number, that the B-bit is 1 and that the time difference setting bit D is 0, the header detecting portion 1501 enables both of the gates 1502 and 1503 and disables the gates 1506 and 1507, thereby to send the packet to the terminal equipment and the selector 1504.

The internal construction or constitution of the separation-insertion portions as shown in FIG. 2 may be employed as that of each of the separation-insertion portions 1302 to 1308. Similarly as in the case of the separation-insertion portion 1301, the internal constitution of the separation-insertion portion shown in FIG. 15 may be employed as that of each of the separation-insertion portions 1302 to 1308. When the constitution illustrated in FIG. 15 is employed, there is no need for outputting a time difference setting packet detection signal to the switch control portion 1342.

Reference numeral 1342 denotes the switch control portion. Operation of this switch control portion 1342 is different from those of the switch control portions of the first and second embodiments in that, when a time difference setting packet detection signal is inputted thereto instead of a control packet detection signal, the switch control portion 1342 of the third embodiment operates according to the control address listed in the connection table of FIG. 4 after the elapse of the preset and predetermined time period. Furthermore, when a time difference setting packet detection signal is inputted to the switch control portion 1342, this portion 1342 issues an instruction to the buffer control portion 1343 so that a time difference setting bit is written to the header of a packet outputted from a predetermined channel (for example, the transmission channel 131 in this embodiment) when the switch 141 performs the predetermined connection (for instance, when the control address A1 is used and the terminals IN1 and OUT1 are connected to each other.

Figure 16:
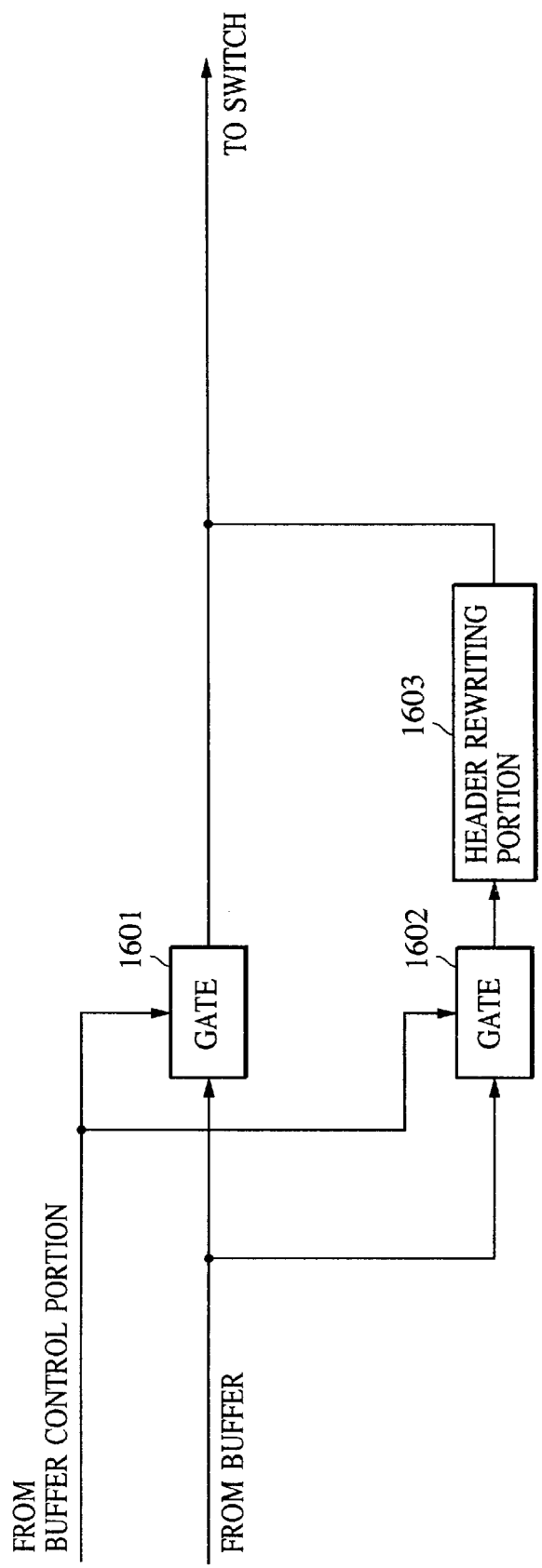
FIG. 16 is a diagram showing the internal constitution of a time difference information setting portion of the node device of each of the third and fourth embodiments of the present invention.

Reference numeral 1310 denotes a time difference information setting portion that is operative to rewrite the header of a packet under the control of the buffer control portion 1443. FIG. 16 shows the configuration of the time difference information setting portion. The enabling and disabling of the gates 1601 and 1602 are performed according to instructions outputted from the buffer control portion. A header rewriting portion 1603 sets a time difference setting bit in the header of a packet, i.e., sets the bit D to D=1. If the buffer control portion 1443 issues no instruction for writing a time difference setting bit, the time difference information setting portion operates in a state where the gate 1601 is enabled and the gate 1602 is disabled.

The buffer control portion 1343 enables the gate 1602 of the time difference information setting portion 1310 and disables the gate 1601 according to the instruction issued from the switch control portion 1342 so that the time difference setting bit is written to the header of the packet outputted from the buffer 111. Further, the buffer control portion 1343 sends the packet to the header rewriting portion 1603. The packet (namely, the time difference setting packet) having the header, in which the time difference setting bit D being 1 has been written by the head rewriting portion 1603, is outputted to the switch 141. Further, this packet is outputted from the transmission channel 131 when the terminals In1 and OUT1 are connected to each other.

Operations of the other composing elements are similar to those of like or corresponding elements of the first and second embodiments. Thus, the description of operations of such elements is omitted herein.

The configuration of the network according to the third embodiment will be described hereinbelow by referring to FIG. 6. Each of node devices 601 to 604 has the configuration indicated by reference numeral 1300 in FIG. 13. The node devices connected in the network according to this embodiment are classified into two kinds of devices, namely, a master node device and slave node devices, similarly as in the case of the first and second embodiments.

The master node device is operative voluntarily to output a time difference setting packet when the network is started. Namely, the switch control portion 1342 operates so that a time difference setting packet is outputted from the switch 141 to the transmission channel 131 when the switch 141 uses the control address A1 and moreover, the terminals IN1 and OUT1 are connected to each other. Further, only the master node device does not output a time difference setting packet detection signal even when receiving a time difference setting packet. Thus, the switch control portion of the master node device does not operate in accordance with a time difference setting packet detection signal. Moreover, the network is controlled in a centralized manner by providing only one master node device in the network. In this embodiment, the node device 601 is employed as a master node device.

The slave node devices are node devices other than the master node device. A slave node device placed just downstream of the master node device receives a time difference setting packet generated by the master node device. This slave node device sends the time difference setting packet to another slave node device, which is located more downstream than the former node slave, by performing the aforementioned operation. In this embodiment, node devices 602, 603 and 604 are employed as slave node devices.

In the aforementioned network, a time difference setting packet is transmitted at the time of starting the network so that the use of the same connection table with the predetermined time difference is performed by each of the node devices. This solves the problem of increasing transmission delay in broadcast communications, in comparison with ordinary communications.

Next, the operation procedure at the time of starting this network will be described. First, when the power to each of the node devices is turned on, the synchronization among the node devices is established with the result that each of the node devices comes to be able to recognize the leading part of a packet when receiving the packet. Thus, each of the node devices can detect the header of each packet. The switch control portion 1342 periodically changes the connection condition of the switch by performing the sequential and periodical alteration of the control address among the addresses A1 to A8 listed in the connection table. Incidentally, the time difference among the times at which the connection table is used by the node devices, respectively, depends on the power-on timing and is thus indefinite.

Under such a condition, the operation procedure is performed as follows.

9-1. In the master node device 601, the switch control portion 1342 and the buffer control portion 1343 operate so that a time difference setting packet is outputted to the transmission channel 131 when the switch 141 uses the control address A1 and the terminals IN1 and OUT1 are connected to each other. Namely, the time difference information setting portion 1310 sends a packet, which is read from the buffer 111 when the control address A1 is used, to the header rewriting portion 1603 by enabling the gate 1602 and disabling the gate 1601. The packet (namely, the time difference setting packet) having the header, in which the time difference setting bit D being 1 has been written by the head rewriting portion 1603, is outputted from the transmission channel 131 when the terminals IN1 and OUT1 are connected to each other.

9-2. The time difference setting packet outputted to the transmission channel 131 enters the separation-insertion portion 1301 from the transmission channel 121 of the slave node device 602. The header detecting portion 1501 detects that the content of the time difference setting bit D is 1. Then, according to the other header information (B, N, T), one or both of the gates 1506 and 1507 are enabled. Further, the gates 1502 and 1503 are disabled. Thus, the packet is transmitted to one or both of the header rewriting portions 1508 and 1509. Subsequently, the header detecting portion 1501 outputs a time difference detecting packet detection signal to the switch control portion 1342.

9-3. When the time difference setting packet detection signal is inputted to the switch control portion 1342 of the slave node device 602, the switch control portion 1342 reads the control address A1 listed on the connection table of FIG. 4 after the elapse of a preset and predetermined time period. Thereafter, the switch control portion 1342 reads the control addresses A2, A3, ..., A8, A1, A2, ... in this order. Thus, the switch control portion 1342 operates according to the read control addresses. In this embodiment, in view of the time between the outputting of a packet from the node device 601 and the inputting of the packet to the node device 602 and the processing time required by the node device 602, a time period during which the adjoining upstream node device (namely, the node device 601) uses the control address A7 and the own-node device (i.e., the node device 602) uses the control address A1 at the same time, is employed as the predetermined time period.

9-4. Further, concurrently with the step 9-3, the switch control portion 1342 and the buffer control portion 1343 operate so that a time difference setting packet is outputted to the transmission channel 131 when the switch 141 uses the control address A1 and the terminals IN1 and OUT1 are connected to each other. That is, when the control address A1 is used, the time difference information setting portion 1310 enables the gate 1602 and disables the gate 1601 and thus transmits the packet to the header rewriting portion 1603. The packet (the time difference setting packet) having the header, in which the time difference setting bit being 1 has been written by the head rewriting portion 1603, is outputted from the transmission channel 131 when the terminals IN1 and OUT1 are connected to each other.

9-5. The aforementioned operations at steps 9-2, 9-3 and 9-4 are performed in the slave node device 603.

9-6. The aforementioned operations at steps 9-2, 9-3 and 9-4 are performed in the slave node device 604.

9-7. The time difference setting packet outputted to the transmission channel 131 enters the separation-insertion portion 1301 from the transmission channel 121 of the master node device 601. The header detecting portion 1501 detects that the content of the time difference setting bit is 1. Then, according to the other header information (B, N, T), one or both of the gates 1506 and 1507 are enabled. Further, the gates 1502 and 1503 are disabled. Thus, the packet is transmitted to one or both of the header rewriting portions 1508 and 1509. Incidentally, only the master node device does not cause the header detection portion 1501 to output a time difference setting packet detection signal. Thus, the switch control portion of the master node device does not operates in accordance with a time difference setting packet detection signal.

The use of the connection table in each of the node device with the predetermined time difference is realized by circulating a time difference setting packet through the network. Note that a time difference setting packet is transmitted from the adjacent upstream node device during the upstream node device uses the control address A1 on the connection table. Thus, the use of the connection table in each of the node device with the predetermined time difference is achieved by making the own node device use the control address A1 on the connection table after the elapse of a predetermined time period since the reception of the time difference setting packet. Generally, the time difference in the time of using the control address on the connection table as between the master node device and the upstream slave node device is different from the time difference in the time of using the control address on the connection table as between the other adjoining node devices (incidentally, in the foregoing case, the time difference in the time of using the control address on the connection table between the adjoining node devices has the same value for all of pairs of adjacent node devices).

As a result of following this procedure, an downstream node device 602 operates using the control address A7, A8, A1 . . . at the same moment when a node device (for example, the node device 601) operates using the control address A1, A2, A3 . . . . Similarly, a more downstream node device 603 operates using the control address A5, A6, A7 . . . at the same moment when the node device 601 operates by using the control address A1, A2, A3 . . . . Likewise, a far more downstream node device 604 operates using the control address A3, A4, A5 . . . at the same moment when the node device 601 operates by using the control address A1, A2, A3 . . . .

Therefore, the node device of the configuration illustrated in FIG. 13 solves the problem of increased transmission delay in broadcast communications, in comparison with ordinary communications.

(Fourth Embodiment)

Hereinafter, a fourth embodiment of the present invention will be described.

Figure 17A:
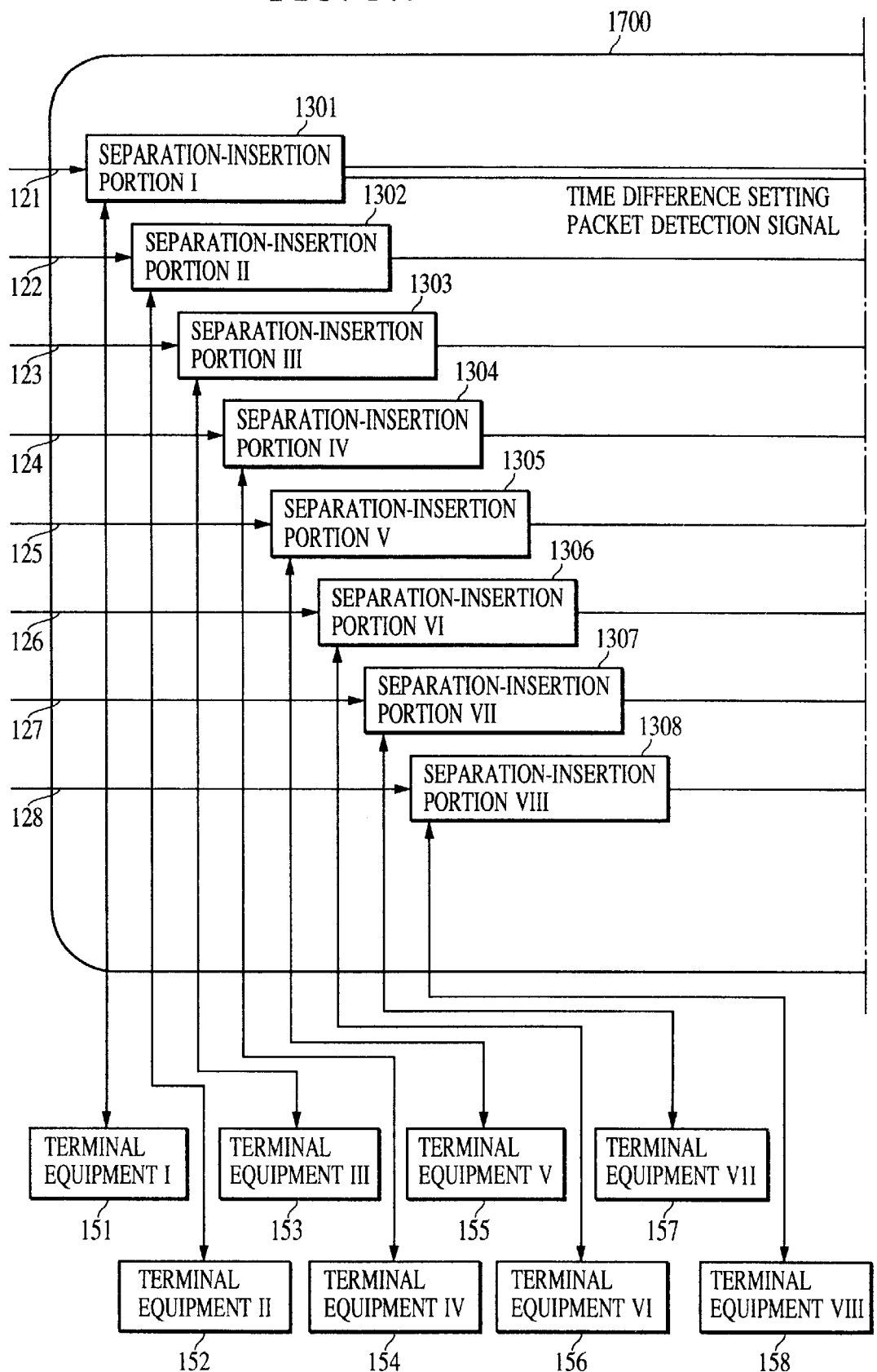
FIG. 17, consisting of FIGS. 17A and 17B, is a diagram showing the configuration of a node device of the fourth embodiment of the present invention.

FIG. 17 is a diagram showing the configuration of a node device according to the fourth embodiment of the present invention. The difference in configuration of the node device between this embodiment and the third embodiment shown in FIG. 13 is that a time difference information setting portion 1310 for rewriting the header of a packet and outputting a time difference setting packet is placed at the input side of the switch 141 (according to the third embodiment), while such a time difference information setting portion 1310 is placed at the output side of the switch 141 (according to the fourth embodiment). Thus, in FIGS. 17 and 13, like reference numeral designate like composing elements of the node device, and the description of such constituent elements is omitted herein.

The operation procedure at the time of starting the network according to the second embodiment is the same as the operation procedure according to the third embodiment. Therefore, the time difference, with which the control address on the connection table is used in each of the node devices, is set by following such procedure.

Consequently, even the node device of the configuration shown in FIG. 17 solves the problem of increased transmission delay in broadcast communications, in comparison with ordinary communications.

(Fifth Embodiment)

Figure 18A:
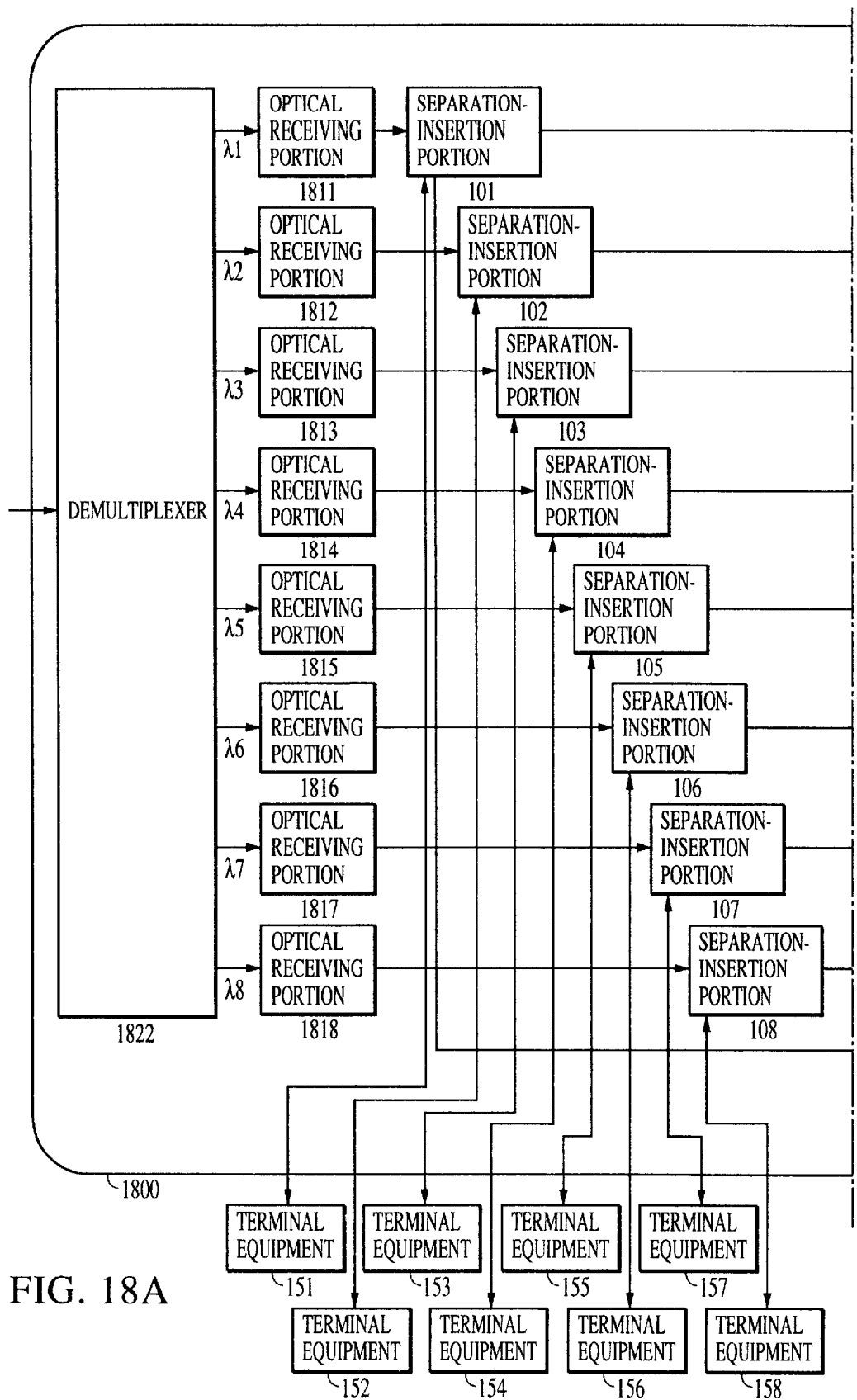
FIG. 18, consisting of FIGS. 18A and 18B, is a diagram showing the configuration of a node device of a fifth embodiment of the present invention.

Next, a fifth embodiment of the present invention will be described. FIG. 18 is a diagram showing the configuration of a node device of this embodiment of the present invention. Differently from the first embodiment which employs a space division switch as the switch 141, and adopts space division parallel multiplex transmission paths, for instance, ribbon fibers as the transmission paths, the fifth embodiment performs multiplexing of a signal on a single optical fiber by utilizing wavelength division multiplexing. Moreover, the fifth embodiment performs switching between two opposed node devices. Furthermore, transmission paths (not shown) for transmitting clock signals may be multiplexed.

In FIG. 18, reference numerals 1801 to 1808 designate variable wavelength transmission portions that are optical transmitters adapted to convert an input signals into an optical signal of a given wavelength by controlling the injection current of a laser diode and to output the converted optical signal. Reference numeral 1809 denotes a wavelength control portion for setting the transmitting wavelength of the variable wavelength transmission portions 1801 to 1808 at an arbitrary value according to the wavelength control pattern of FIG. 4. For instance, the control address is sequentially and periodically changed in the order of A1 to A8, so that the signal input to the input terminal IN1 of the variable wavelength transmission portion is changed into optical signals having wavelengths λ1 to λ8. More specifically, in the variable wavelength transmission portion 1801, optical signals of wavelengths λ1, λ2, λ3, λ4, λ5, λ6, λ7 and λ8, respectively, are obtained in response to the control addresses A1, A2, A3, A4, A5, A6, A7 and A8.

Likewise, the variable wavelength transmission portion 1802 repeatedly converts a signal inputted to the input terminal IN2 into optical signals, whose wavelengths are λ2, λ3, λ4, λ5, λ6, λ7, λ8, and λ1 respectively, in this order. This is the same with other variable wavelength transmission portions 1803 to 1808. The period of alteration of the wavelength is set, for example, at an integral multiple of a packet length. Every several packet wavelengths, the transmitting wavelength is changed repeatedly. Further, the wavelength control pattern to be used is not limited to the pattern shown in FIG. 4. However, this embodiment uses the wavelength control pattern, according to which the plurality of the variable wavelength transmission portions do not transmit signals at the same wavelength simultaneously. Reference numeral 1821 denotes a multiplexer for condensing optical signals, which are outputted from the variable wavelength transmission portions, into a single optical fiber and for then outputting the optical signals to external optical fiber transmission paths. Reference numeral 1822 designates a demultiplexer for separating optical signals of wavelengths λ1 to λ8 transmitted from the external optical fiber transmission path into respective (component) signals of wavelengths λ1 to λ8. Reference numerals 1811 to 1818 denote optical receiving portions for electrically converting optical signals of wavelengths λ1 to λ8, which are separated by the demultiplexer 1822, into electric signals. The remaining portions of the fifth embodiment are similar to those of the first embodiment. Like reference numerals designate like constituent elements in the figure.

The operation procedure at the time of starting the network according to the fifth embodiment is the same as the operation procedure according to the first embodiment. Therefore, the time difference, with which the control address on the connection table is used in each of the node devices, is set by following such procedure.

Consequently, even the node device of the configuration shown in FIG. 18 solves the problem of increased transmission delay in broadcast communications, in comparison with ordinary communications.

(Sixth Embodiment)

Figure 19A:
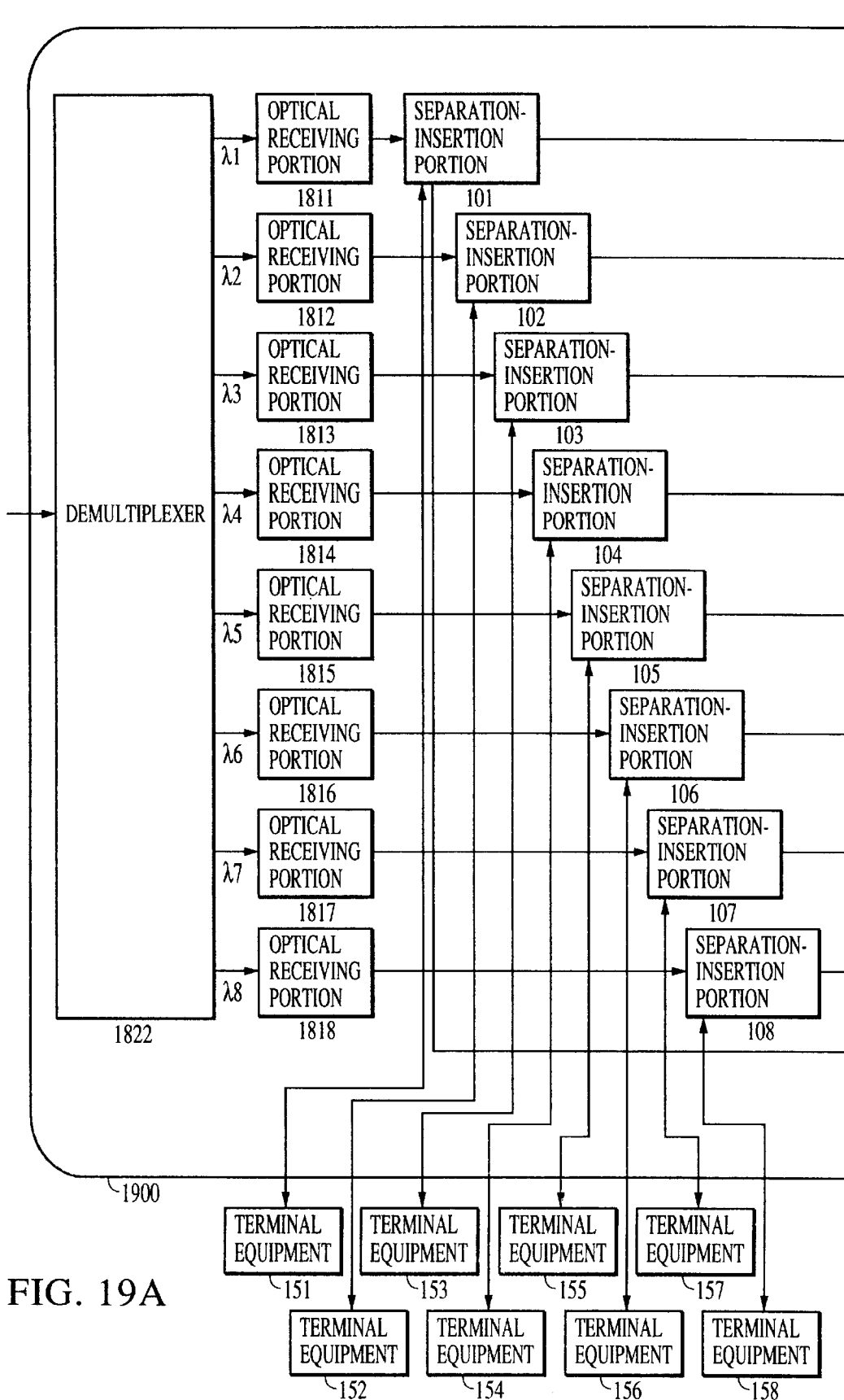
FIG. 19, consisting of FIGS. 19A and 19B, is a diagram showing the configuration of a node device of a sixth embodiment of the present invention.

Next, a sixth embodiment of the present invention will be described. FIG. 19 is a diagram showing the configuration of a node device of this embodiment of the present invention. Differently from the third embodiment which employs a space division switch as the switch 141, and adopts space division parallel multiplex transmission paths, for instance, ribbon fibers as the transmission paths, the sixth embodiment performs multiplexing of a signal on a single optical fiber by utilizing wavelength division multiplexing. Moreover, the sixth embodiment performs switching between two opposed node devices. Furthermore, an operation of the wavelength multiplex portion is the same as of the fifth embodiment. Transmission paths (not shown) for transmitting clock signals may be multiplexed.

The operation procedure at the time of starting the network according to the sixth embodiment is the same as the operation procedure according to the first embodiment. Therefore, the time difference, with which the control address on the connection table is used in each of the node devices, is set by following such procedure.

Consequently, even the node device of the configuration shown in FIG. 19 solves the problem of increased transmission delay in broadcast communications, in comparison with ordinary communications.

(Seventh Embodiment)

Figure 20A:
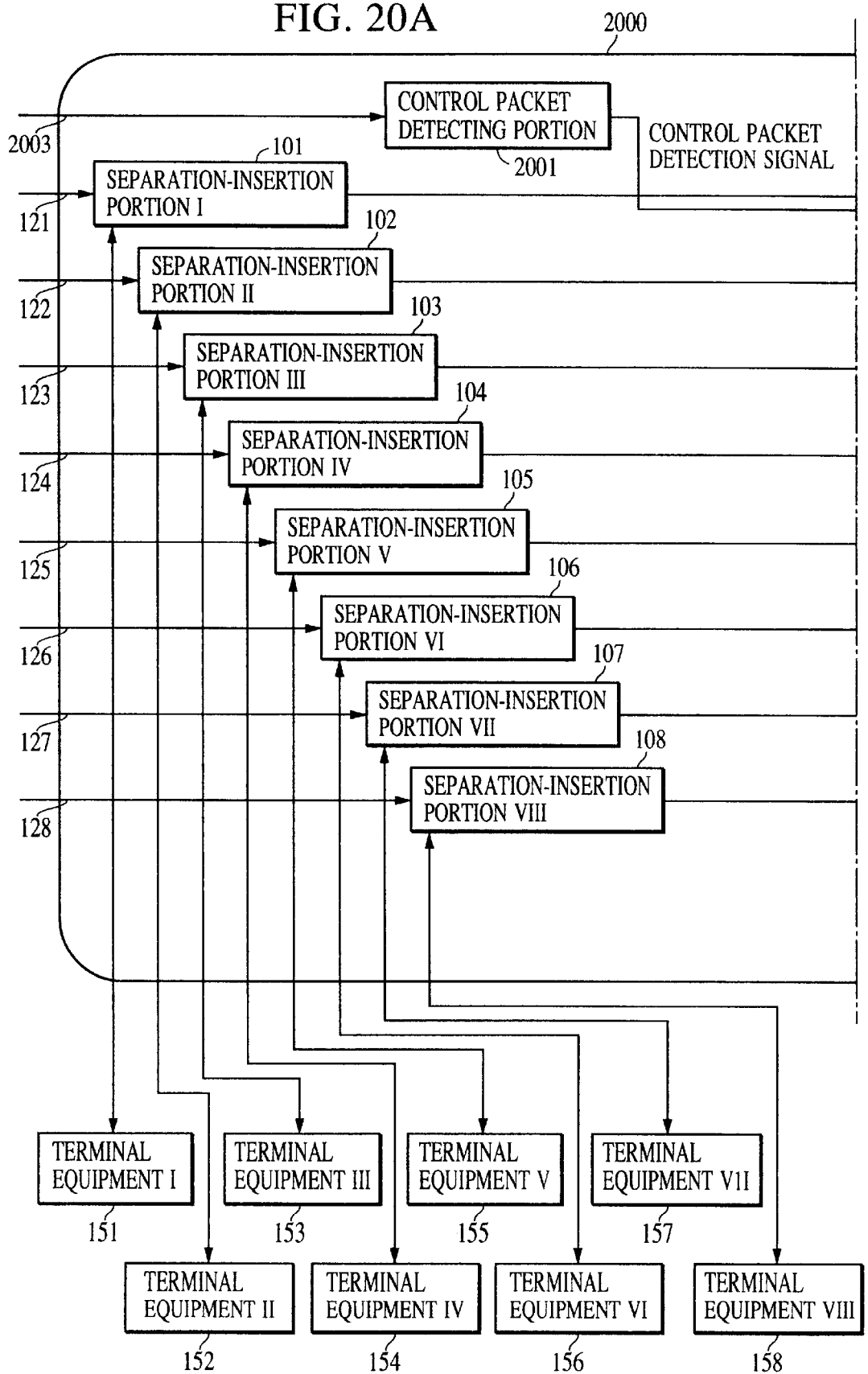
FIG. 20, consisting of FIGS. 20A and 20B, is a diagram showing the configuration of a node device of a seventh embodiment of the present invention.

Now, a seventh embodiment of the present invention will be described. FIG. 20 is a diagram showing the configuration of a node device of this embodiment of the present invention. The seventh embodiment is similar to the first and second embodiments in the respect that at least when starting the network, the transmission of a control packet is performed so that the same connection table is used in each of the node devices with the predetermined time difference. However, the seventh embodiment is different from the first and second embodiments in the following respect. The control packet is transmitted through the transmission channel 1, which is used for communicating or transmitting data packets in the first and second embodiments, whereas the seventh embodiment is provided with a channel for transmitting a control packet (referred to as "transmission channel 0") and a control packet is caused to flow into the transmission channel.

The node device illustrated in FIG. 1 or 10 is different from the node device shown in FIG. 2 in that the latter node device has transmission channels 2003 and 2004 for transmitting control packets, which are added to the former device, and in that the latter node device does not require the selector 159 which is necessary for the node device of FIG. 1 or 10. Additionally, the separation-insertion portion 101 of FIG. 20 does not require a control packet detecting portion. Thus, the conventional separation-insertion portion (see FIG. 2) may be used as the separation-insertion portion 101 of FIG. 20. The remaining constituent elements of the seventh embodiment are similar to those of other embodiments. Like reference numerals designate like elements in the figure, and the description of such elements is omitted herein.

Next, the operation procedure at the time of starting this network will be described hereinbelow. First, when power to each of the node devices is turned on, the synchronization among the node devices is established, with the result that each of the node devices come to be able to recognize the leading part of a packet when receiving the packet. Thus, each of the node devices can detect the header of each packet. The switch control portion 142 periodically changes the connection condition of the switch by performing the sequential and periodical alteration of the control address among the addresses A1 to A8 listed in the connection table. Incidentally, the time difference among the times at which the connection table is used by the node devices, respectively, depends on the power-on timing and is thus indefinite.

Under such a condition, the operation procedure is performed as follows.

10-1. In the master node device 601, the buffer control portion outputs a control signal to the control packet generating portion 2002 so that a control packet is outputted from the control packet generating portion 2002 to the transmission channel 2004.

10-2. The control packet outputted to the transmission channel 2004 enters the control packet detecting portion 2001 from the transmission channel 2003 of the slave node device 602. The control packet detecting portion 2001 outputs a control packet detection signal to the switch control portion 142.

10-3. When receiving the control packet detection signal, the switch control portion 142 of the slave node device 602 performs an operation by using the control addresses arranged in the predetermined order on the connection table of FIG. 4 after the elapse of a preset and predetermined time period. When receiving a control packet detection signal, the switch control portion 142 reads the control address A1 after the elapse of the preset and predetermined time period. Subsequently, this switch control portion 142 reads the control addresses A2, A3, . . . , A8, A1, A2, . . . in this order. Thus, the switch control portion 142 operates according to the read control addresses. Similarly as in the case of the aforementioned embodiments, a time period, during which the adjoining upstream node device (namely, the node device 601) uses the control address A7 and the own node device (namely, the node device 602) uses the control address A1 at the same time, is employed in this embodiment as the predetermined time period.

10-4. Further, concurrently with the step 10-3, the switch control portion 142 issues an instruction to the buffer control portion 143 so that a control packet is outputted from the control packet generating portion 2002 to the transmission channel 2004 when the switch 141 uses the control address A1 and the terminals IN1 and OUT1 are connected to each other. The buffer control portion 143 outputs a control signal to the control packet generating portion 2002 so that a control packet is outputted from the control packet generating portion 2002 to the transmission channel 2004.

10-5. The aforementioned operations at steps 10-2, 10-3 and 10-4 are performed in the slave node device 603.

10-6. The aforementioned operations at steps 10-2, 10-3 and 10-4 are performed in the slave node device 604.

10-7. The control packet outputted to the transmission channel 2004 enters the control packet detecting portion 2001 from the transmission channel 2003 of the master node device 601. Only the master node device does not cause the control packet detecting portion 2001 to output a control packet detection signal to the switch control portion 142. Thus, the switch control portion 142 of the master node device does not operate in accordance with a control packet detection signal.

The time difference, with which the control address on the connection table is used in each of the node devices, is set by following this procedure.

Consequently, even the node device of the configuration shown in FIG. 20 solves the problem of increased transmission delay in broadcast communications, in comparison with ordinary communications.

(Eighth Embodiment)

Figure 21A:
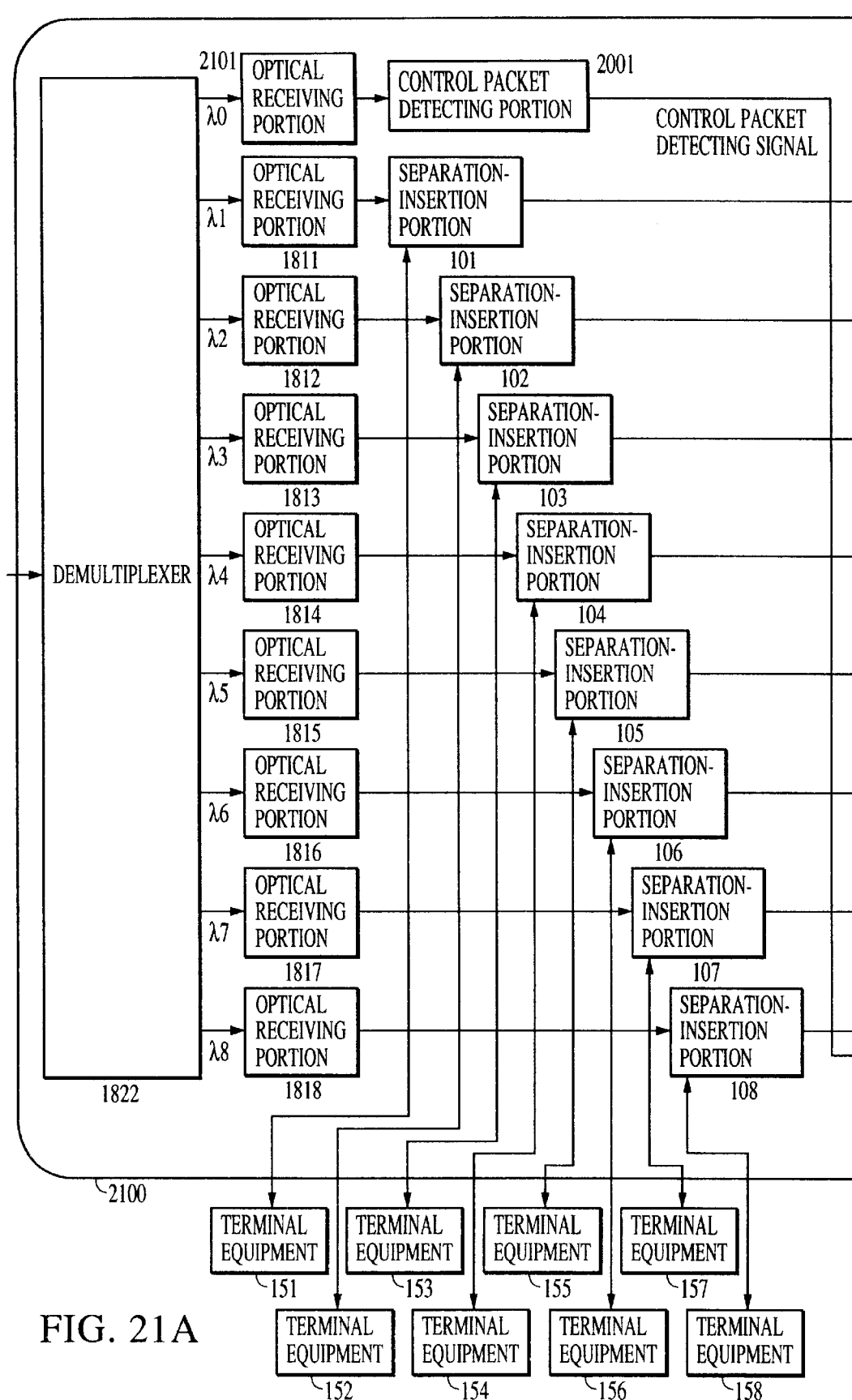
FIG. 21, consisting of FIGS. 21A and 21B, is a diagram showing the configuration of a node device of an eighth embodiment of the present invention.
Figure 21:
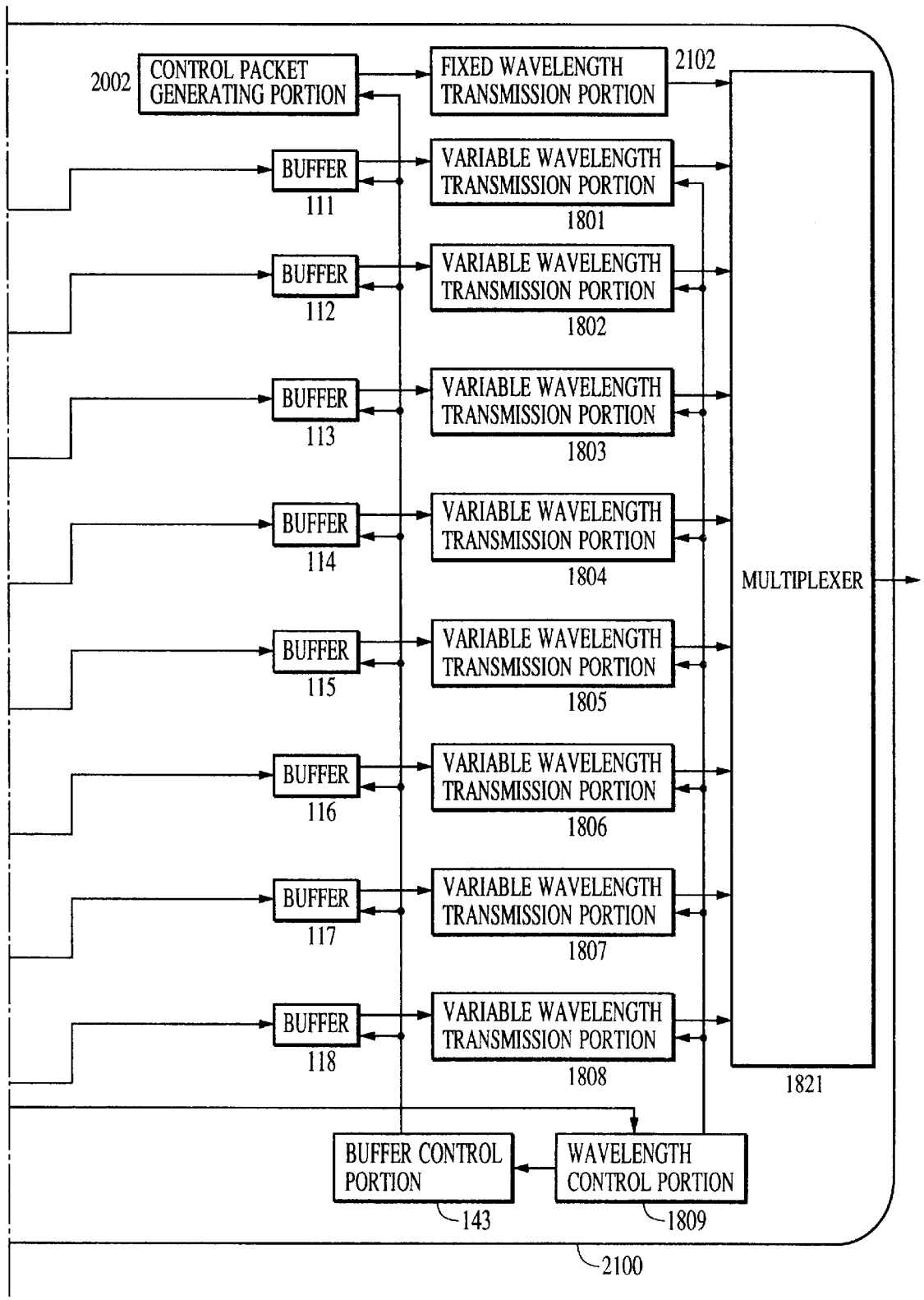

Now, an eighth embodiment of the present invention will be described. FIG. 21 is a diagram showing the configuration of a node device of this embodiment of the present invention. Although the eighth embodiment is similar to the fifth embodiment, the eighth embodiment is different from the fifth embodiment in the following respect. In the fifth embodiment, a control packet is transmitted through the transmission channel 1 (whose transmitting wavelength is λ1) for transmitting ordinary data packet. On the other hand, the eighth embodiment is provided with a channel 1 specifically to the transmission of a control packet (namely, the transmission channel 0 (whose transmitting wavelength is λ0), and control packets are made to flow through the transmission channel 0. The channel for transmitting control packets is not necessarily a variable wavelength transmission portion. Thus, this embodiment employs a fixed-wavelength transmission portion (whose transmitting wavelength is λ0) 2102 as the channel for transmitting control packets.

The operation procedure at the time of starting the network in this case is the same as of the seventh embodiment.

Thus, the time difference, with which the control address on the connection table is used in each of the node devices, is set by following this procedure.

Consequently, even the node device of the configuration shown in FIG. 21 solves the problem of increased transmission delay in broadcast communications, in comparison with ordinary communications.

As described above, a time difference, with which the control address for controlling the switch the variable wavelength transmission portions and so on is used in each of the node devices, is set in a network connecting a plurality of node devices, which are used to connect a plurality of terminal equipment units, through parallel multiplex transmission paths that have a plurality of transmission channels. This solves the problem of increased transmission delay in broadcast communications, in comparison with ordinary communications.

Figure 22:
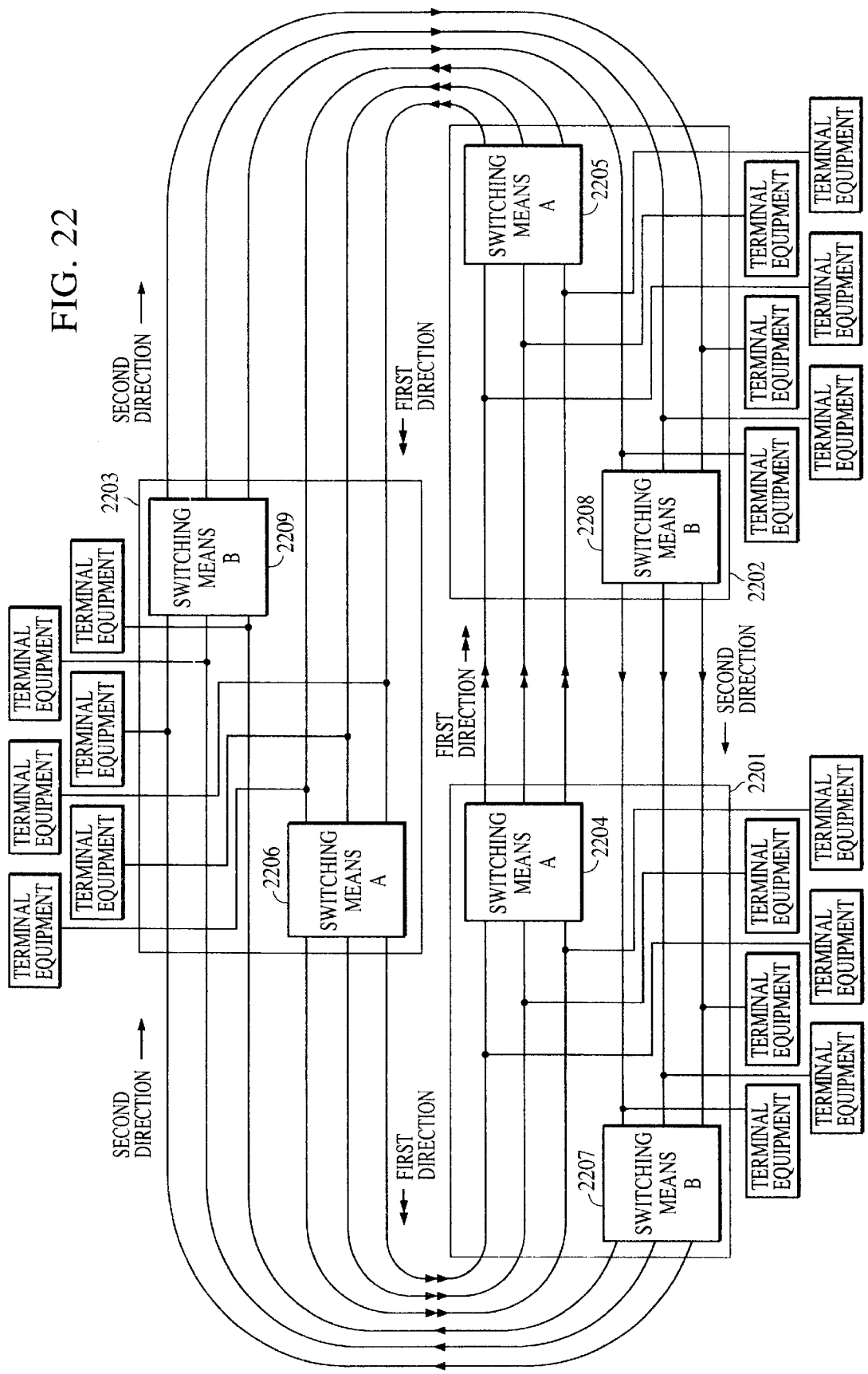
FIG. 22 is a diagram illustrating another embodiment of the present invention.

Incidentally, networks according to the aforementioned embodiments are adapted to transmit signals in a single direction. However, the present invention is not limited thereto. Networks adapted to bidirectionally transmit signals may be employed. FIG. 22 is a conceptual diagram illustrating such a network. This figure shows an example wherein node devices 2201, 2202 and 2203 are bidirectionally connected to each other and placed in a ring pattern. The essential aspect of the present invention resides in that the alteration of the connection relation between the transmission channel for transmitting a signal in a predetermined direction (for example, the first direction shown in FIG. 22) and the buffer (not shown in FIG. 22 which is a merely conceptual diagram) is controlled in a plurality of node devices. Namely, when the first direction is employed as the predetermined direction, the (connection relation) alteration time in each of the switching means A 2204 and 2205 of the node devices 2201 and 2202 should be controlled (namely, the connection-relation alteration timing by each of these switching means should be controlled). Similarly, the alteration time in each of the switching means A 2205 and 2206 of the node devices 2202 and 2203 should be controlled. Likewise, the alteration time in each of the switching means A 2206 and 2204 of the node devices 2203 and 2201 should be controlled. Further, when the second direction is employed as the predetermined direction, the alteration time in each of the switching means B 2207 and 2209 of the node devices 2201 and 2203 should be controlled. Similarly, the alteration time in each of the switching means B 2209 and 2208 of the node devices 2201 and 2203 should be controlled. Likewise, the alteration time in each of the switching means B 2208 and 2207 of the node devices 2202 and 2201 should be controlled.

Figure 23:
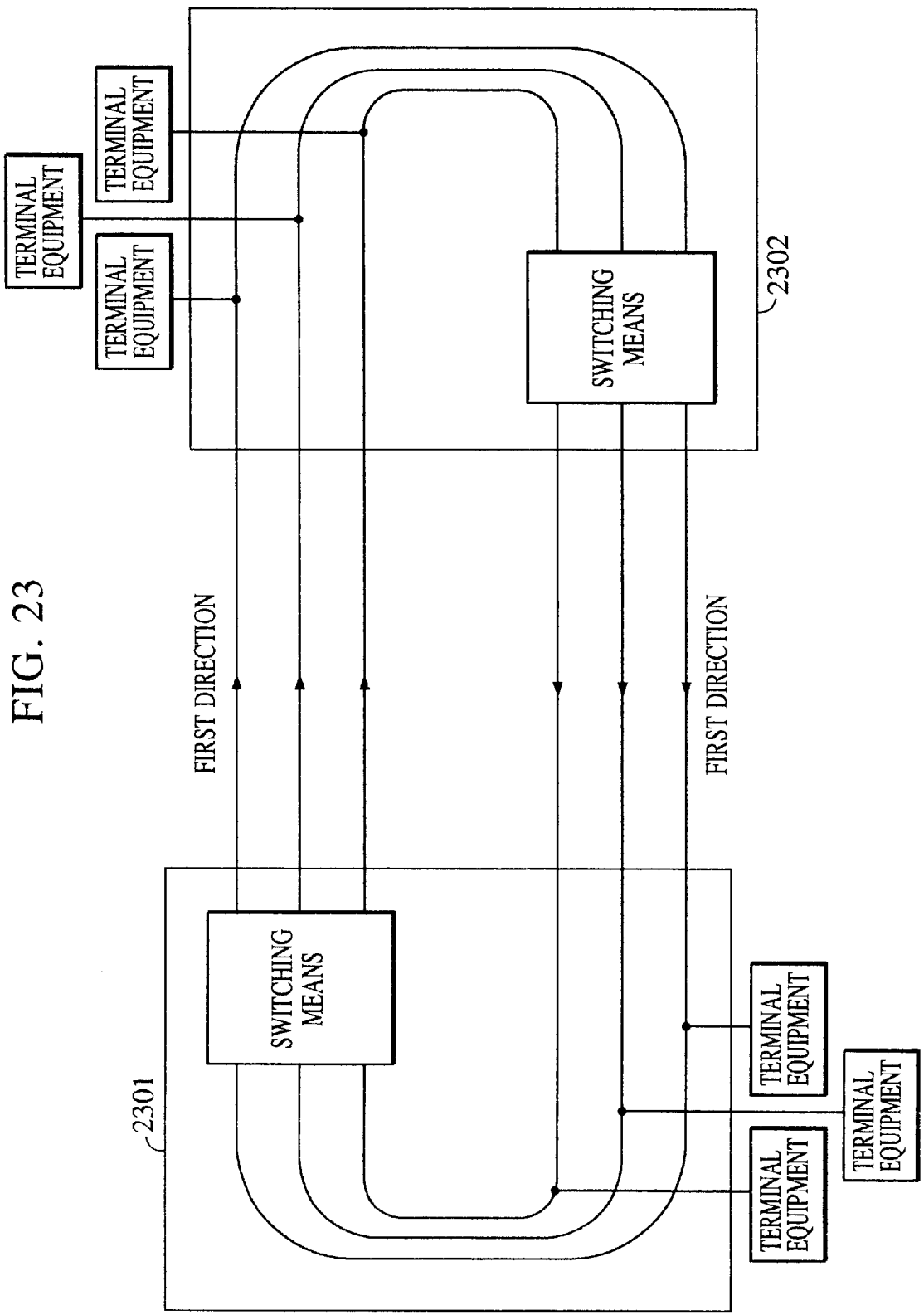
FIG. 23 is a diagram illustrating still another embodiment of the present invention.

Moreover, in the case that the node devices are connected as illustrated in FIG. 23, the transmission direction from the node device 2301 to the node device 2302 is regarded as being logically the same as the transmission direction from the node device 2302 to the node device 2301. Needless to say, this holds in the case of multiplexing the transmission channel from the node device 2301 to the node device 2302 and the transmission channel from the node device 2302 to the node device 2301.

Hence, a direction in which a signal is transmitted through a ring-like route may be the "predetermined direction".

Further, any means being capable of temporarily storing a signal and then outputting the stored signal may be used as the buffers of the aforementioned embodiments. In the case where a plurality of buffers are provided in the device, the buffers may be independent of one another. Further, the buffers may be integrated. Moreover, the buffers may be logically distinguished from one another. Providing buffers, which respectively correspond to a plurality of transmission channels for inputting signals, in the node device is to adapt the node device in such a manner as to store input signals sorted according to the transmission channels, through which the signals are inputted thereto, and to output the signals to corresponding ones of the transmission channels, respectively, independent of one another. In this case, the switching means is operative to change the transmission channel through which a signal is outputted from each of the buffers. The alteration pattern, according to which the switching means changes the transmission channel, should be set so that signals cannot be simultaneously outputted from a plurality of buffers to the same transmission channel and so that the plurality of buffers can output signals to transmission channels which are different from one another. Further, the control of an operation of reading signals from the buffers is facilitated by storing in each buffer the signals sorted according to the transmission channel through which the signals should be outputted. Additionally, the buffers may be adapted in such a way as to store signals, each of which designates no transmission channel for outputting thereof, by distinguishing from signals each of which designates a transmission channel for outputting thereof.

According to the present invention, the switching means serves as means for switching a plurality of channels to arbitrary channels, respectively.

The present invention is effective in the case of a node device wherein a signal should be outputted through a transmission channel corresponding to a transmission channel from which the signal is inputted. Consider, for example, the case that a signal is transmitted through each of parallel channels between node devices. After copies of a signal are made in a node device and are serially outputted to transmission channels, each of node devices output the copy signals, which are inputted from (inputting) transmission channels, to transmission channels respectively corresponding to the inputting transmission channels. When a transmission channel, through which a signal is outputted from the buffer, is altered according to timing addresses to be sequentially changed (for instance, the aforementioned control addresses A1 to A8), upon condition that a signal can be outputted by using a timing address through a transmission channel corresponding to a transmission channel to which the signal is inputted, there is caused the noticeable problem that the waiting time in the buffers is increased. Therefore, the present invention is effective, especially, in such a condition. Such transmission control is effective, for example, in the case of performing broadcasting of a certain signal.

Although the preferred embodiments of the present invention have been described above, it should be understood that the present invention is not limited thereto and that other modifications will be apparent to those skilled in the art without departing from the spirit of the invention.

The scope of the present invention, therefore, is to be determined solely by the appended claims.

What is claimed is:

1. A communication network comprising a plurality of node devices, wherein each node device of said plurality of node devices comprises:
  a plurality of buffers for storing information of a signal received from a respective input channel of a plurality of input channels; and
  a switching means for altering an output channel of a plurality of output channels connected to each buffer of said plurality of buffers in accordance with a predetermined pattern in order;

wherein, a first node device of said plurality of node devices further comprises:
    a receiving means for receiving predetermined information output from another of the plurality of node devices; and
    a control means for controlling in order to deviate a timing when a a first buffer from among said plurality of buffers of an adjacent node device is connected to a first output channel from among said plurality of output channels by said switching means of the adjacent node device, from the timing when the first buffer from among said plurality of buffers of the first node device is connected to the first output channel from among said plurality of output channels by said switching means of the first node device, in accordance with the predetermined information received by said receiving means.

2. The communication network according to claim 1, wherein said predetermined pattern is the pattern wherein said each buffer of said plurality of buffers is connected to a different output channel.

3. The communication network according to claim 1, wherein said predetermined information is communicated by a control packet.

4. The communication network according to claim 1, wherein said predetermined information is communicated by a data packet for communicating data.

5. A node device, comprising:
  a plurality of buffers for storing information of a signal received from a respective input channel of a plurality of input channels;
  a switching means for altering an output channel connected to each buffer of said plurality of buffers in accordance with a predetermined pattern in order;
  a receiving means for receiving predetermined information output from another node device; and
  a control means for controlling in order to deviate a timing when a first buffer from among the plurality of buffers of an adjacent node device is connected to a first output channel from among a plurality of output channels of the adjacent node device by the switching means of the adjacent node device from the timing when the first buffer from among said plurality of buffers of the node device itself is connected to the first output channel from among said plurality of output channels of the node device itself by said switching means of the node device itself, in accordance with the predetermined information received by said receiving means.

6. The node device according to claim 5, wherein said predetermined pattern is the pattern wherein said each buffer of said plurality of buffers of the node device itself is connected to a different one of a plurality of output channel.

7. The node device according to claim 5, wherein said predetermined information is communicated by a control packet.

8. The node device according to claim 5, wherein said predetermined information is communicated by a data packet for communicating data.

9. A communication control method for a communication network comprising a plurality of node devices each having a plurality of buffers for storing information of a signal received from a respective input channel of a plurality of input channels and each having a switching means for altering an output channel of a plurality of output channels connected to each buffer of said plurality of buffers in accordance with a predetermined pattern, in order, wherein a first node device of the plurality of node devices performs the method comprising the steps of:

a receiving process for receiving predetermined information output from another of the plurality of node devices; and a control process for controlling in order to deviate a timing when a first buffer from among said plurality of buffers of an adjacent node device is connected to a first output channel from among said plurality of output channels of the adjacent node device by said switching means of the adjacent node device, from the timing when the first buffer from among said plurality of buffers of the first node device is connected to the first output channel from among said plurality of output channels of the first node device by said switching means of the first node device, in accordance with the predetermined information received by said receiving process.

10. A control method for a first node device having a plurality of buffers for storing information of a signal received from a respective input channel of a plurality of input channels and having a switching means for altering an output channel connected to each buffer of said plurality of buffers in accordance with a predetermined pattern, in order, the method comprising the steps of:

a receiving process for receiving predetermined information output from another node device; and a control process for controlling in order to deviate a timing when a first buffer from among the plurality of buffers of an adjacent node device is connected to a first output channel from among a plurality of output channels of the adjacent node device by the switching means of the adjacent node device, from the timing when the first buffer from among said plurality of buffers of the first node device is connected to the first output channel from among said plurality of output channels of the first node device by said switching means of the first node device, in accordance with the predetermined information received by said receiving process.

* * * * *